Figure 13:
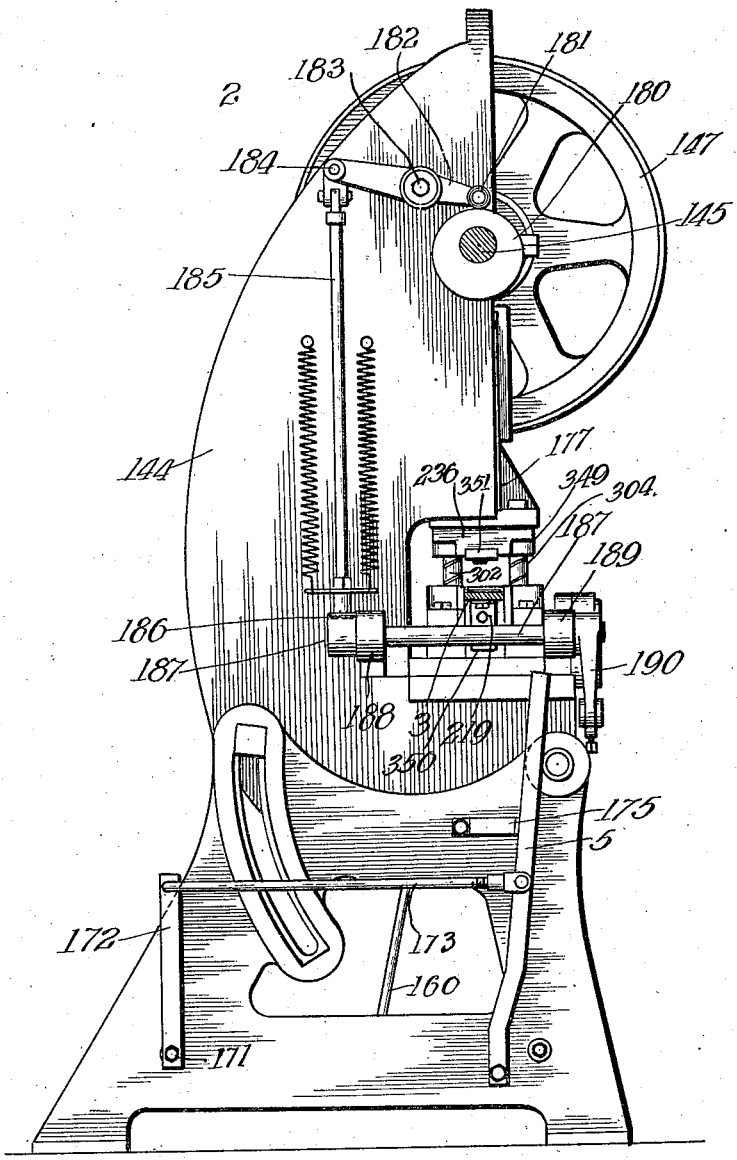

Feb. 22, 1927.
F. M. OPITZ
1,618,219
MACHINE FOR MAKING RADIATOR CORES
Filed May 14, 1923   24 Sheets-Sheet 1
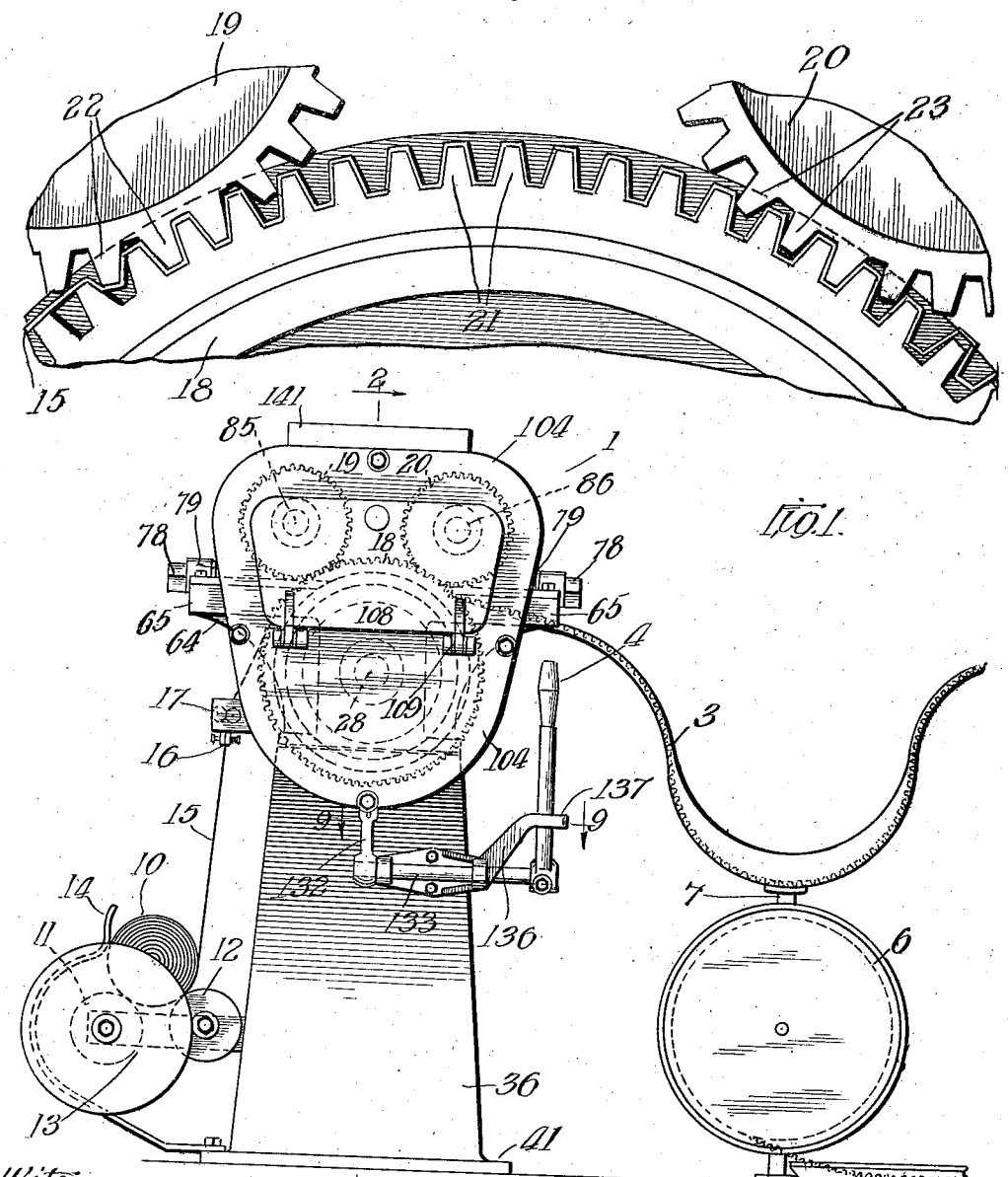

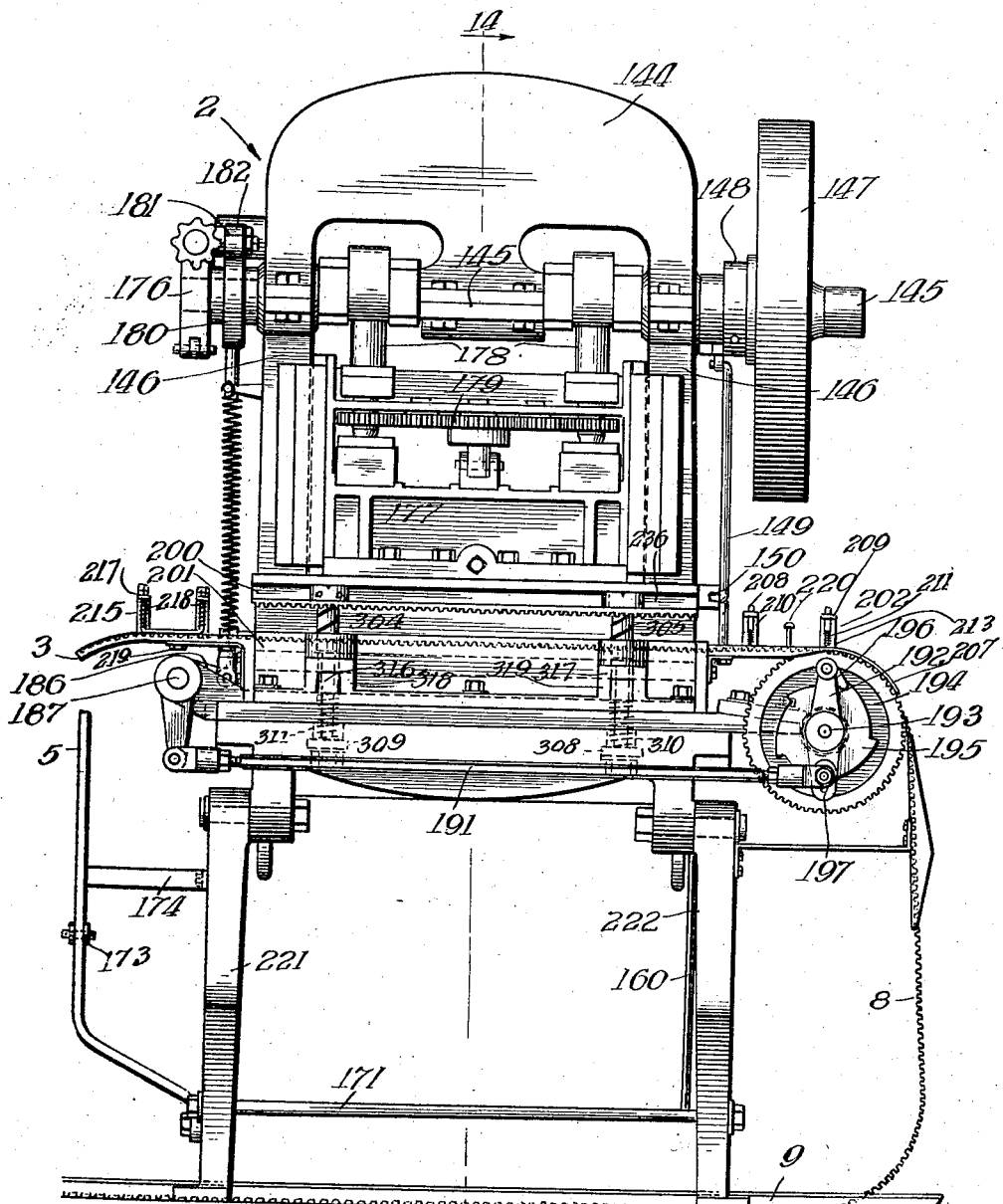

Feb. 22, 1927. 1,618,219
F. M. OPITZ
MACHINE FOR MAKING RADIATOR CORES
Filed May 14, 1923  24 Sheets-Sheet 3
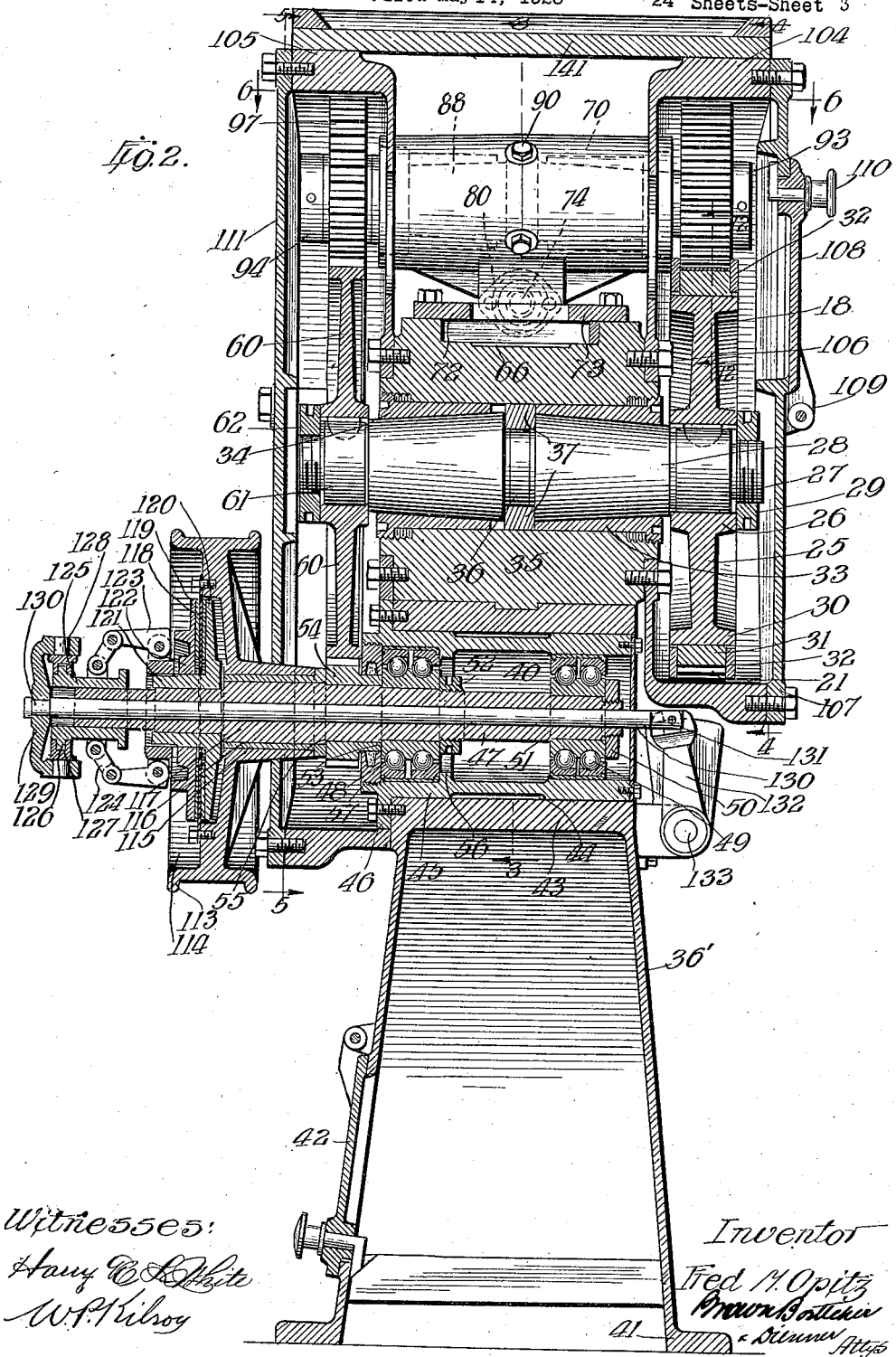

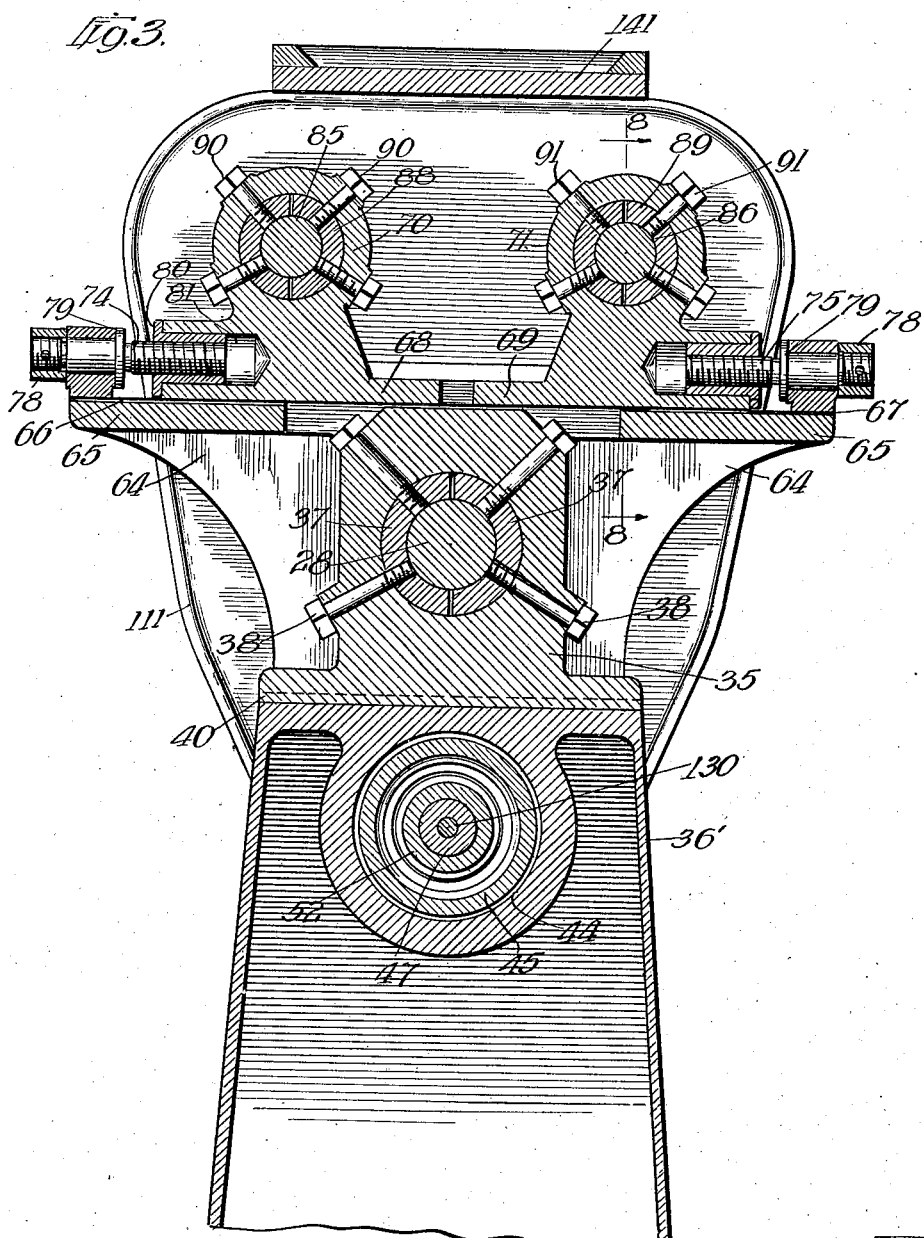

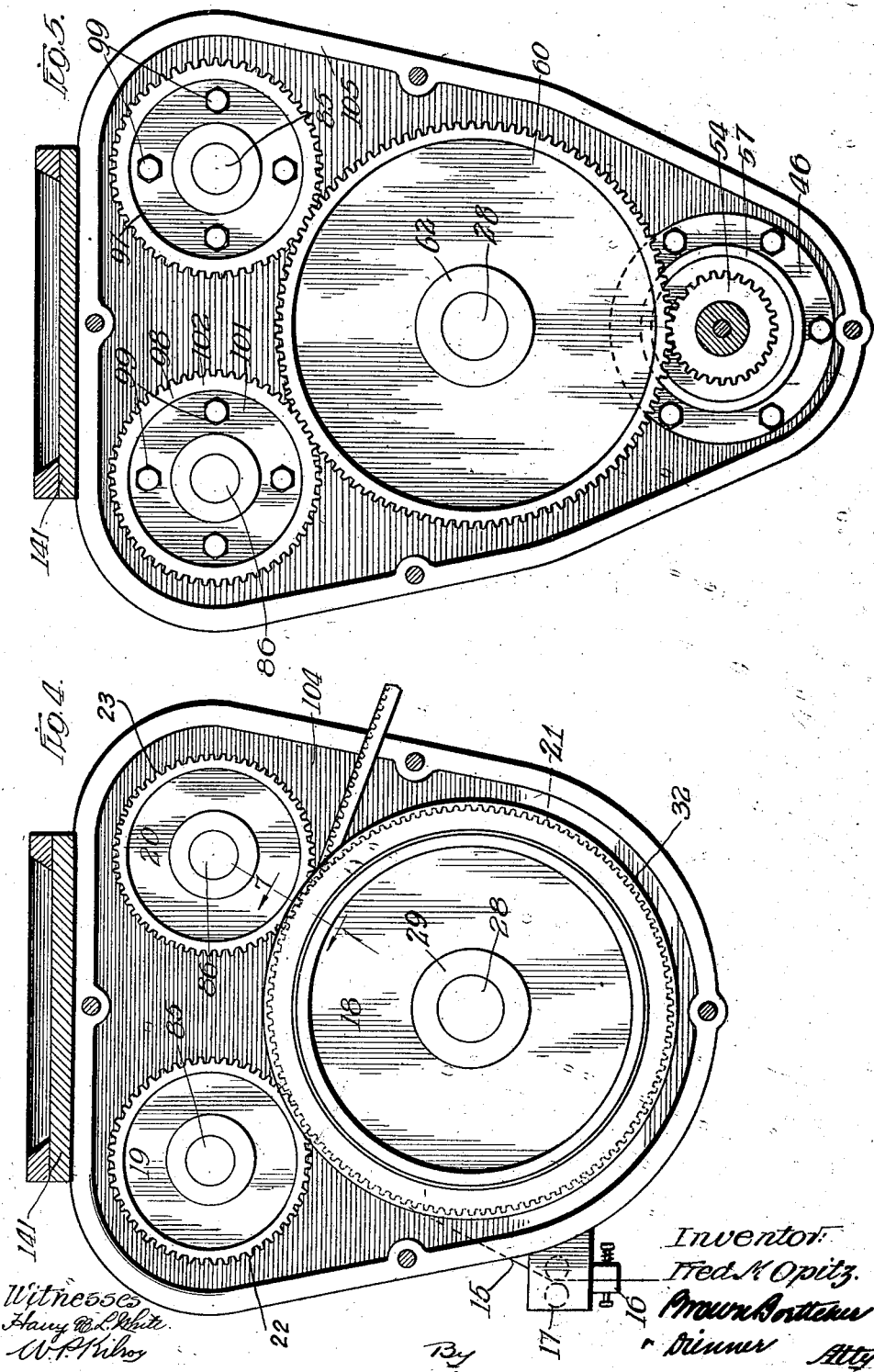

Feb. 22, 1927. 1,618,219
F. M. OPITZ
MACHINE FOR MAKING RADIATOR CORES
Filed May 14, 1923 24 Sheets-Sheet 6
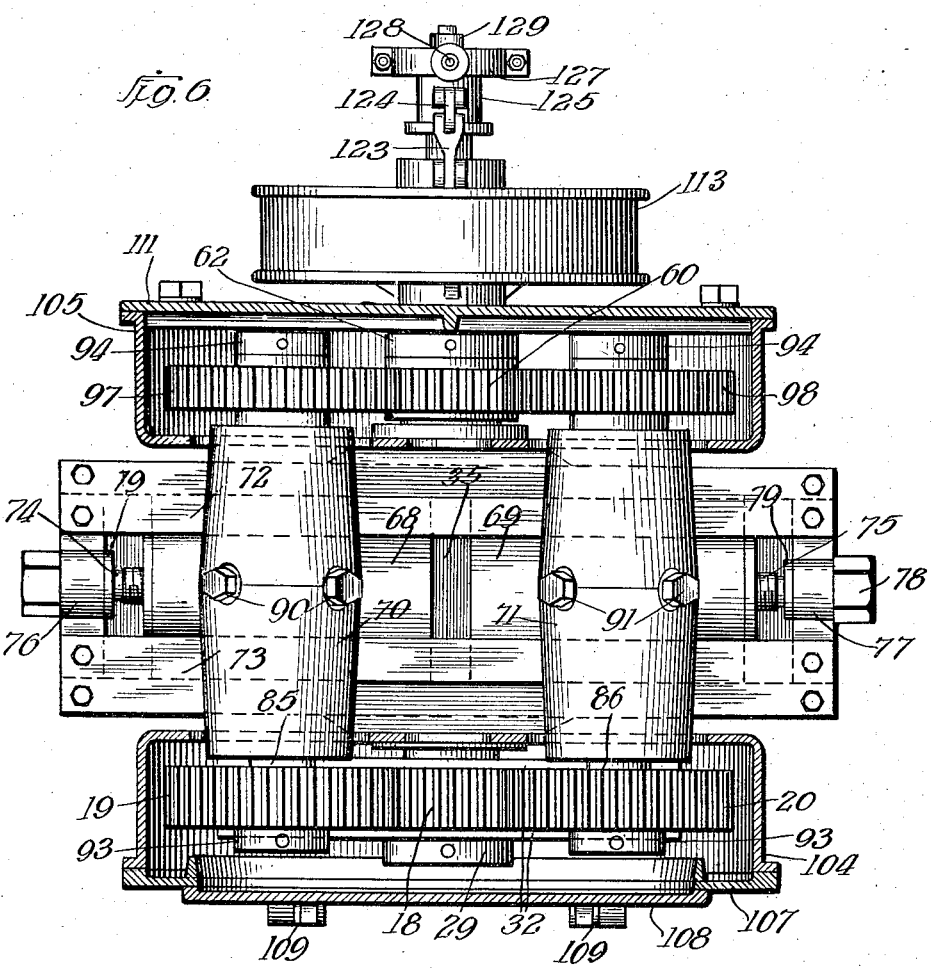
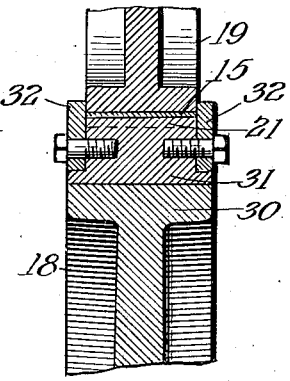
Witnesses:
Harry B. White
W. F. Kilroy
Inventor:
Fred M. Opitz
By Brown Bottcher Dienner
Attys.

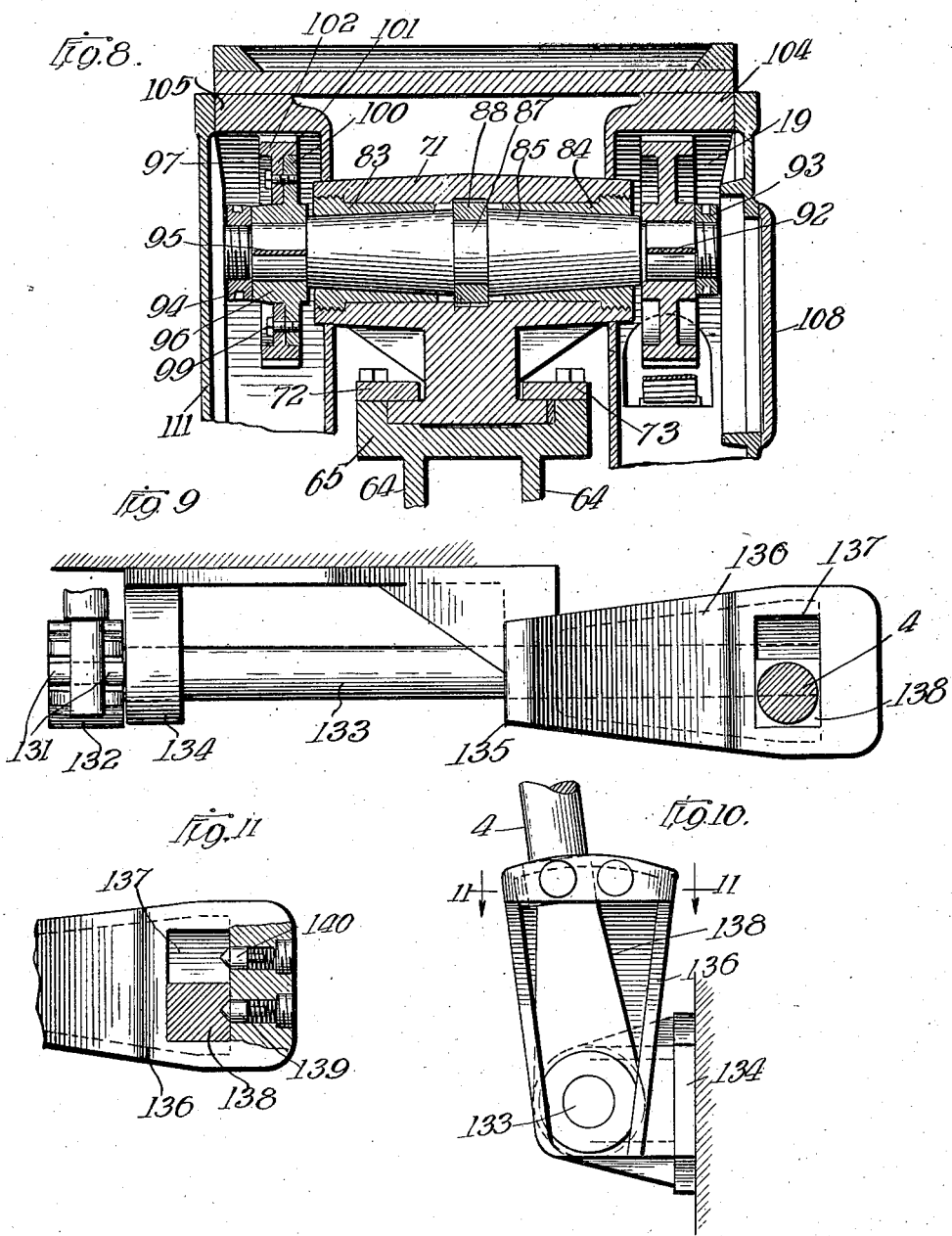

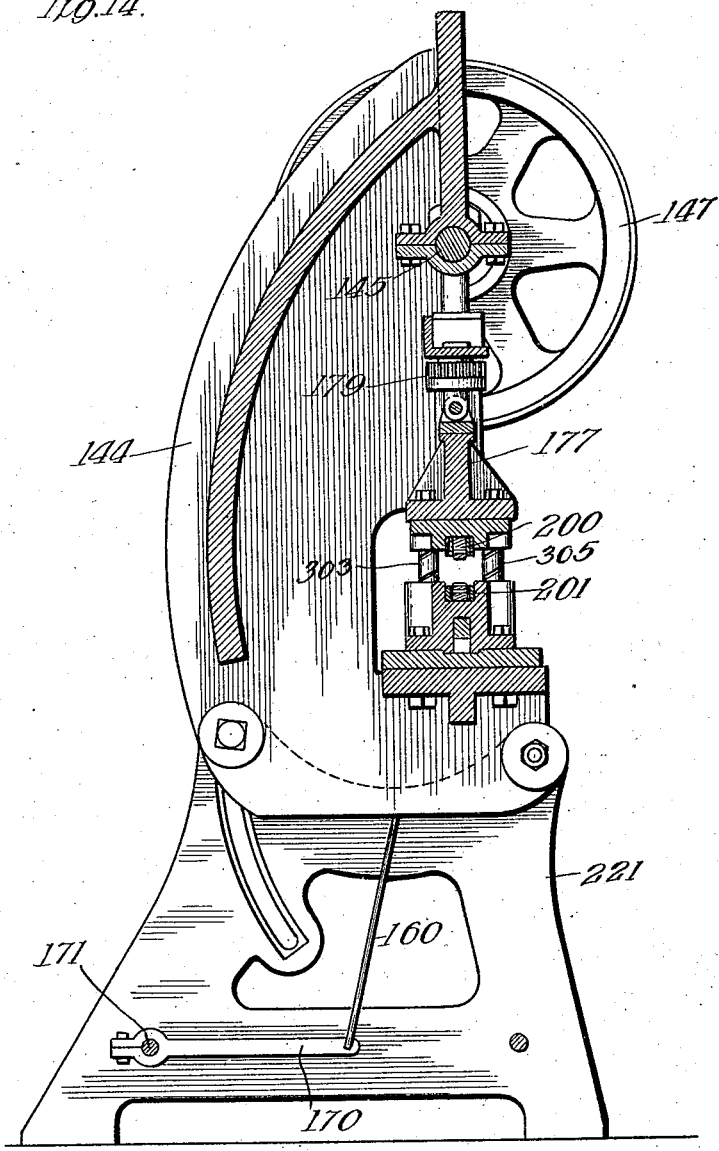

Feb. 22, 1927.  
F. M. OPITZ  
1,618,219  
MACHINE FOR MAKING RADIATOR CORES  
Filed May 14, 1923     24 Sheets-Sheet 10
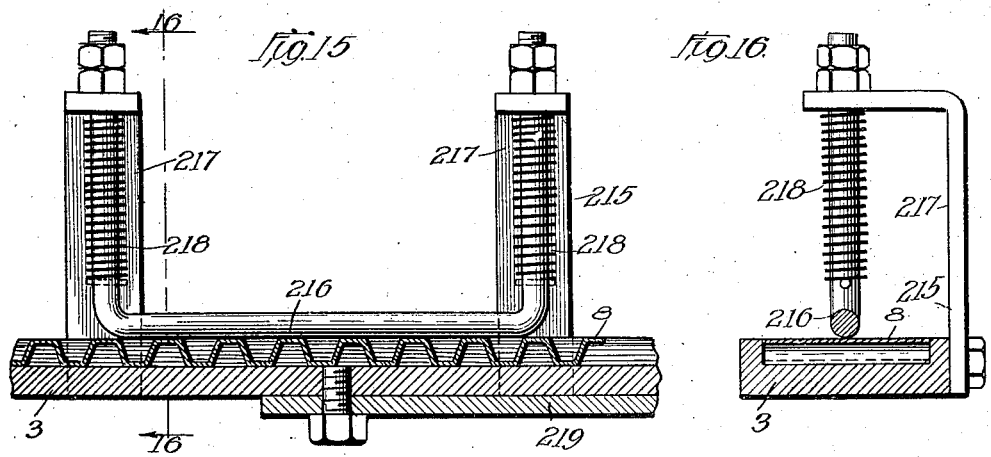
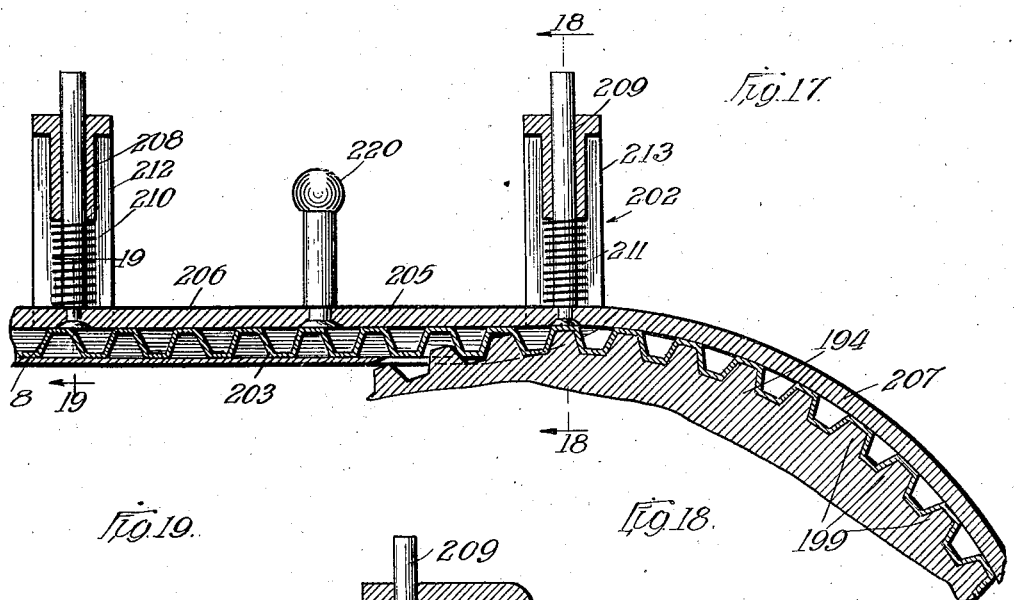
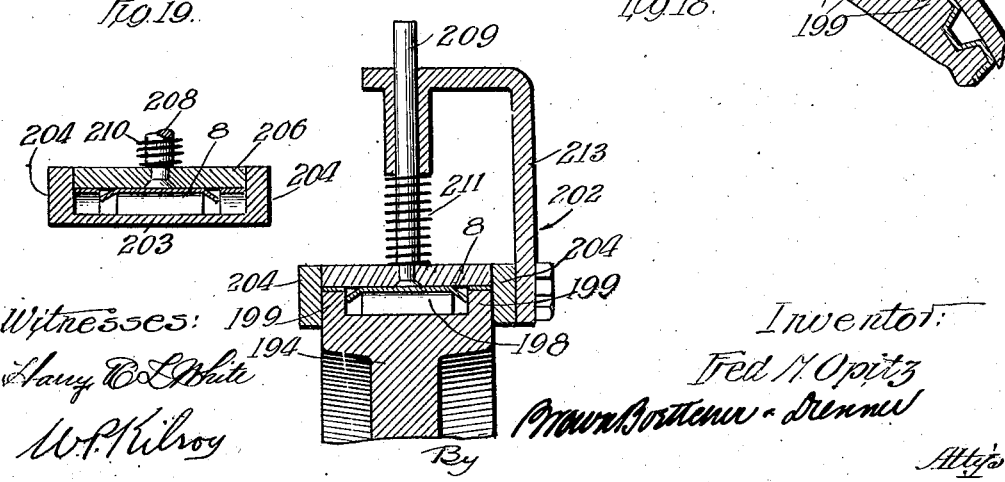

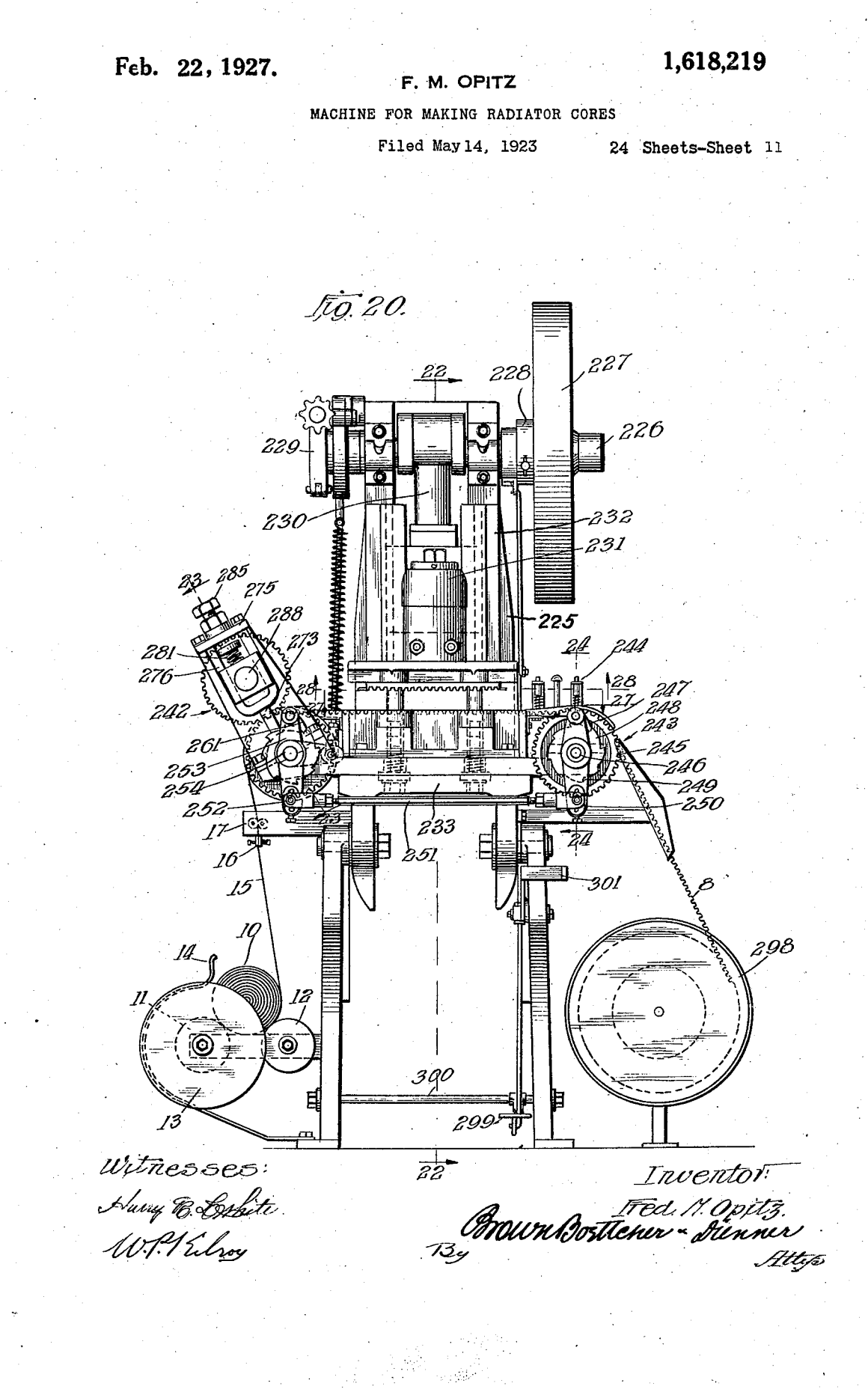

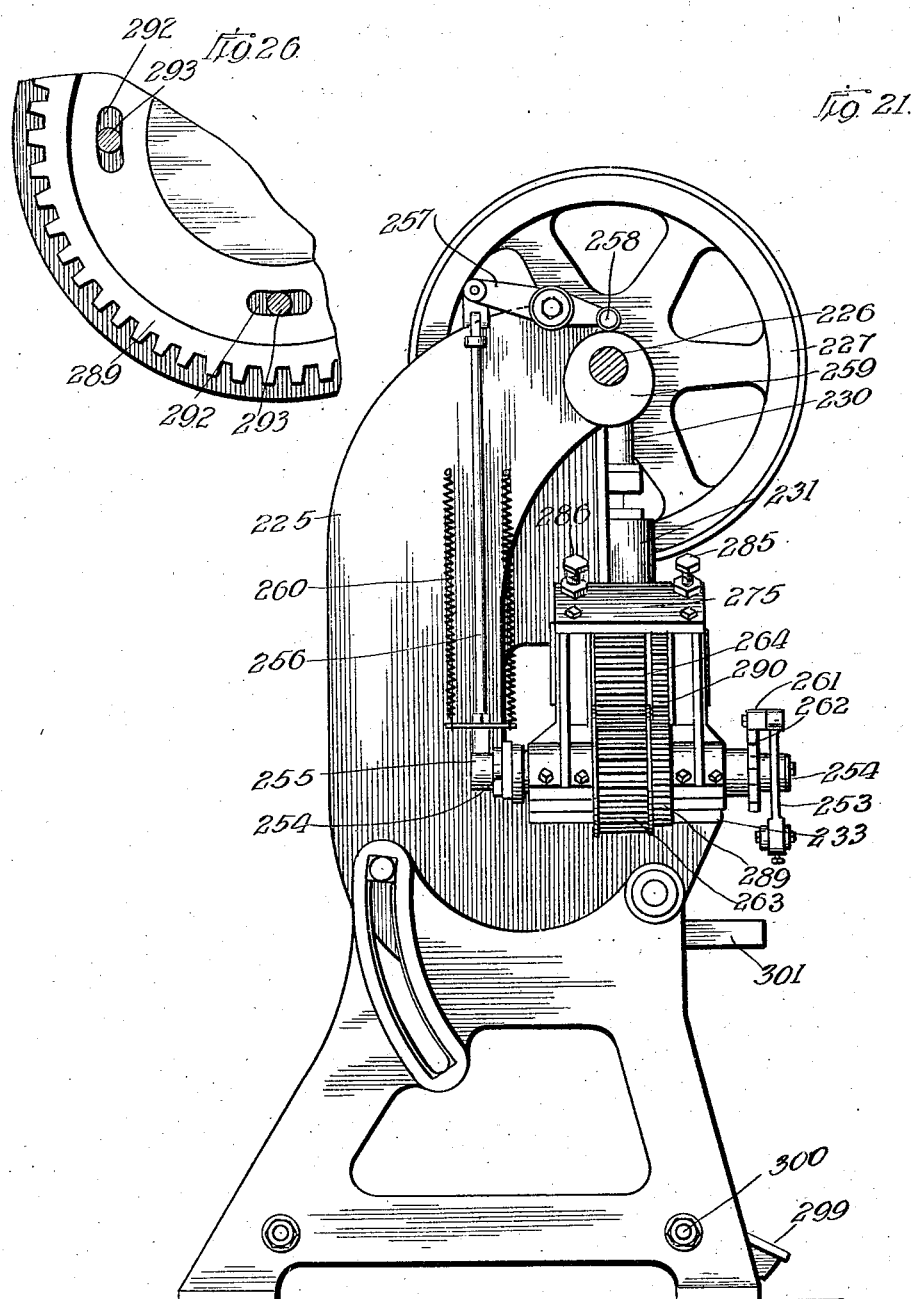

Feb. 22, 1927.  
F. M. OPITZ  
1,618,219  
MACHINE FOR MAKING RADIATOR CORES  
Filed May 14, 1923   24 Sheets-Sheet 13
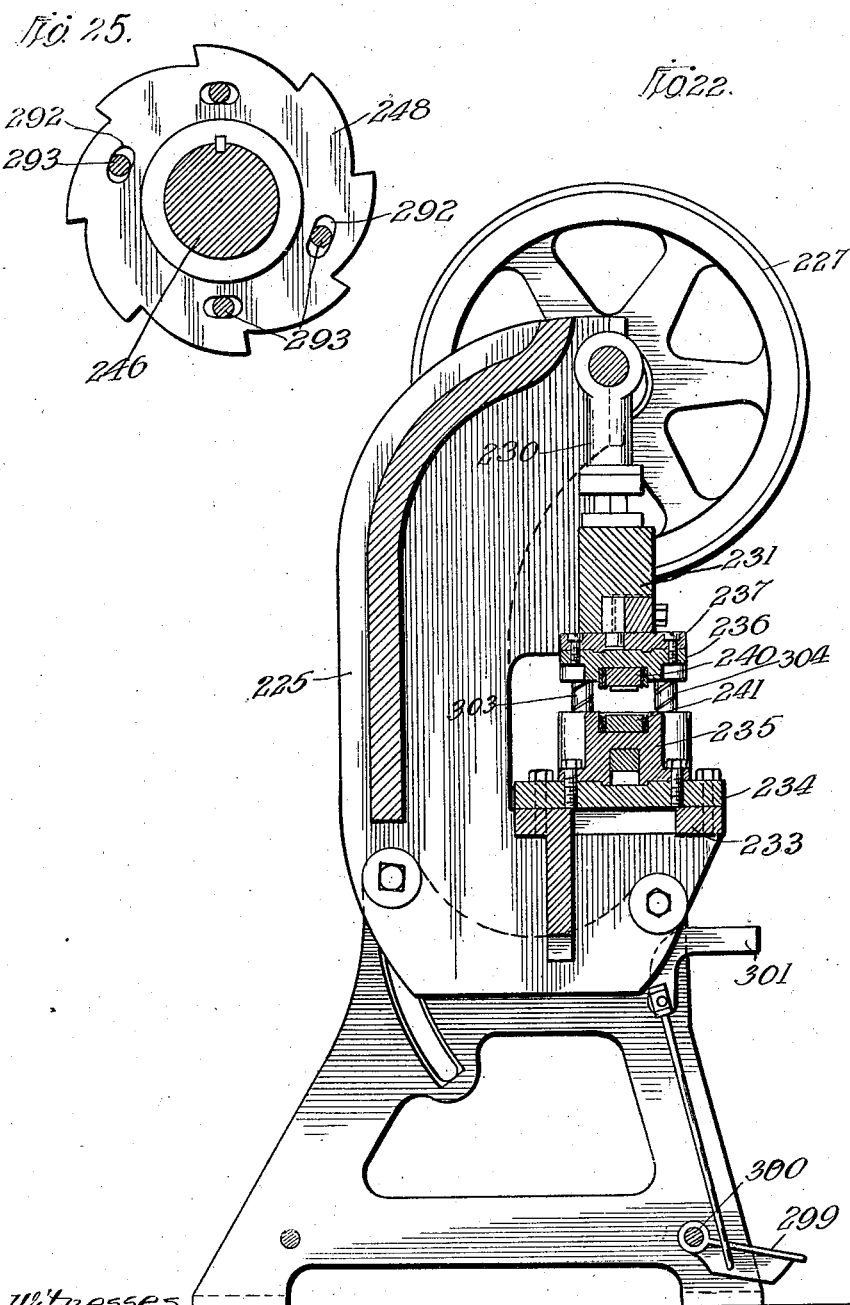

Feb. 22, 1927.
F. M. OPITZ
1,618,219
MACHINE FOR MAKING RADIATOR CORES
Filed May 14, 1923   24 Sheets-Sheet 14

Witnesses
Inventor
Fred. M. Opitz

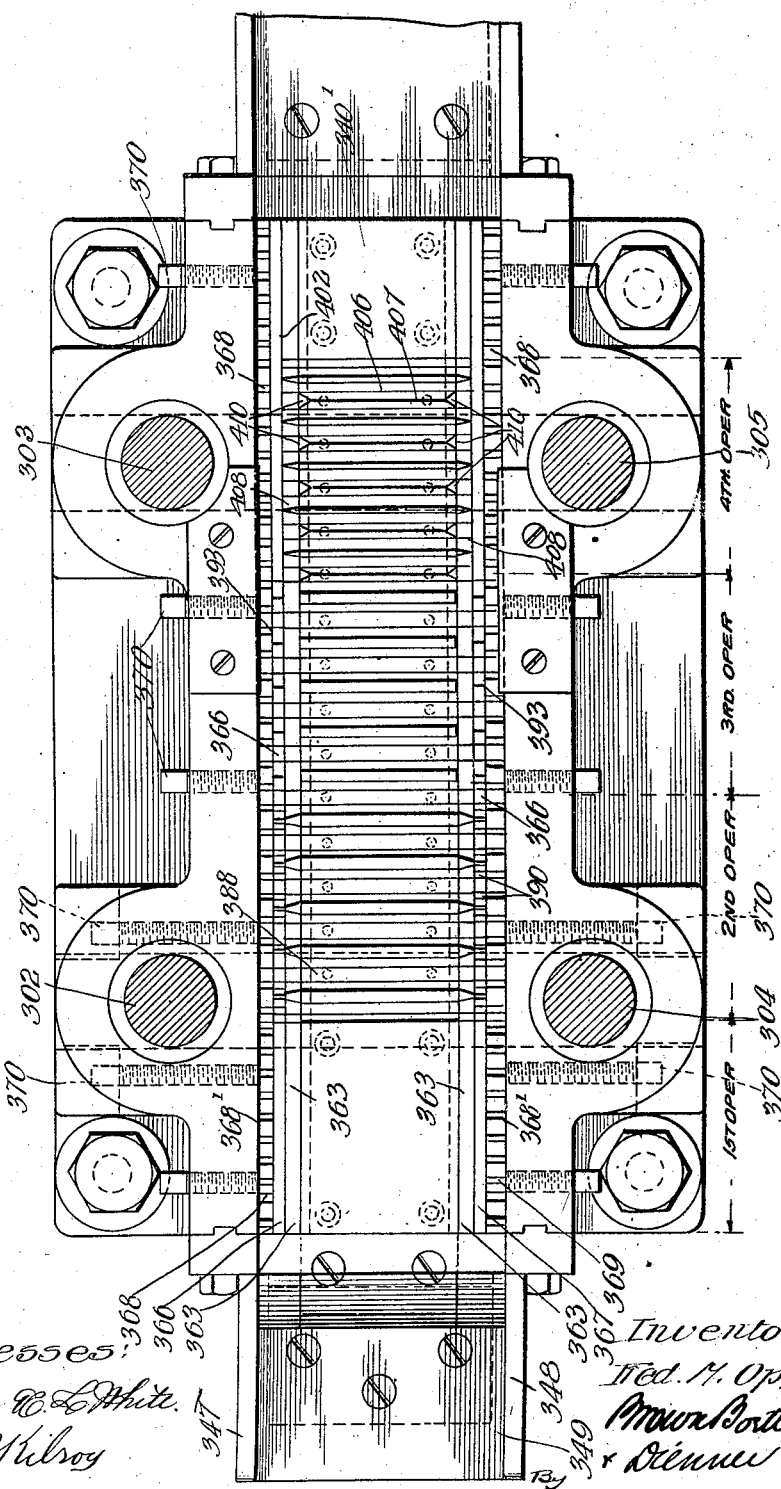

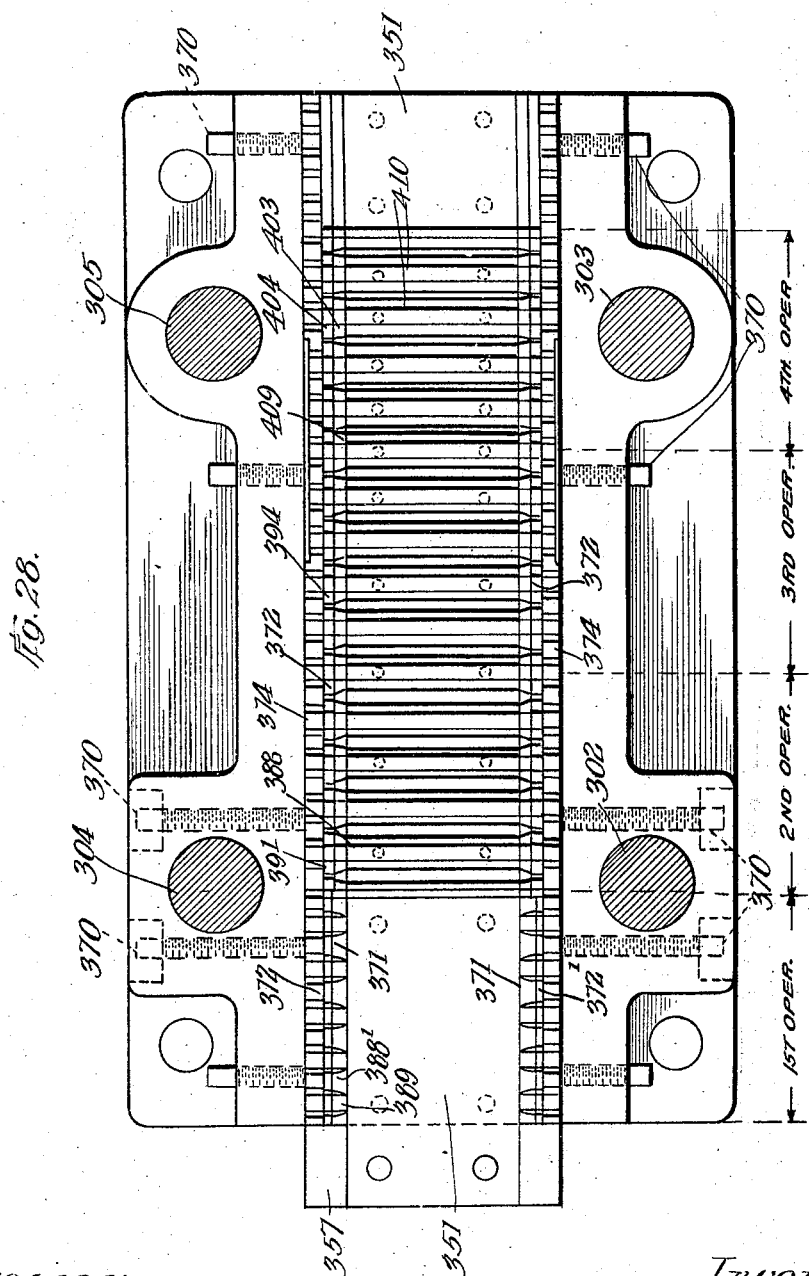

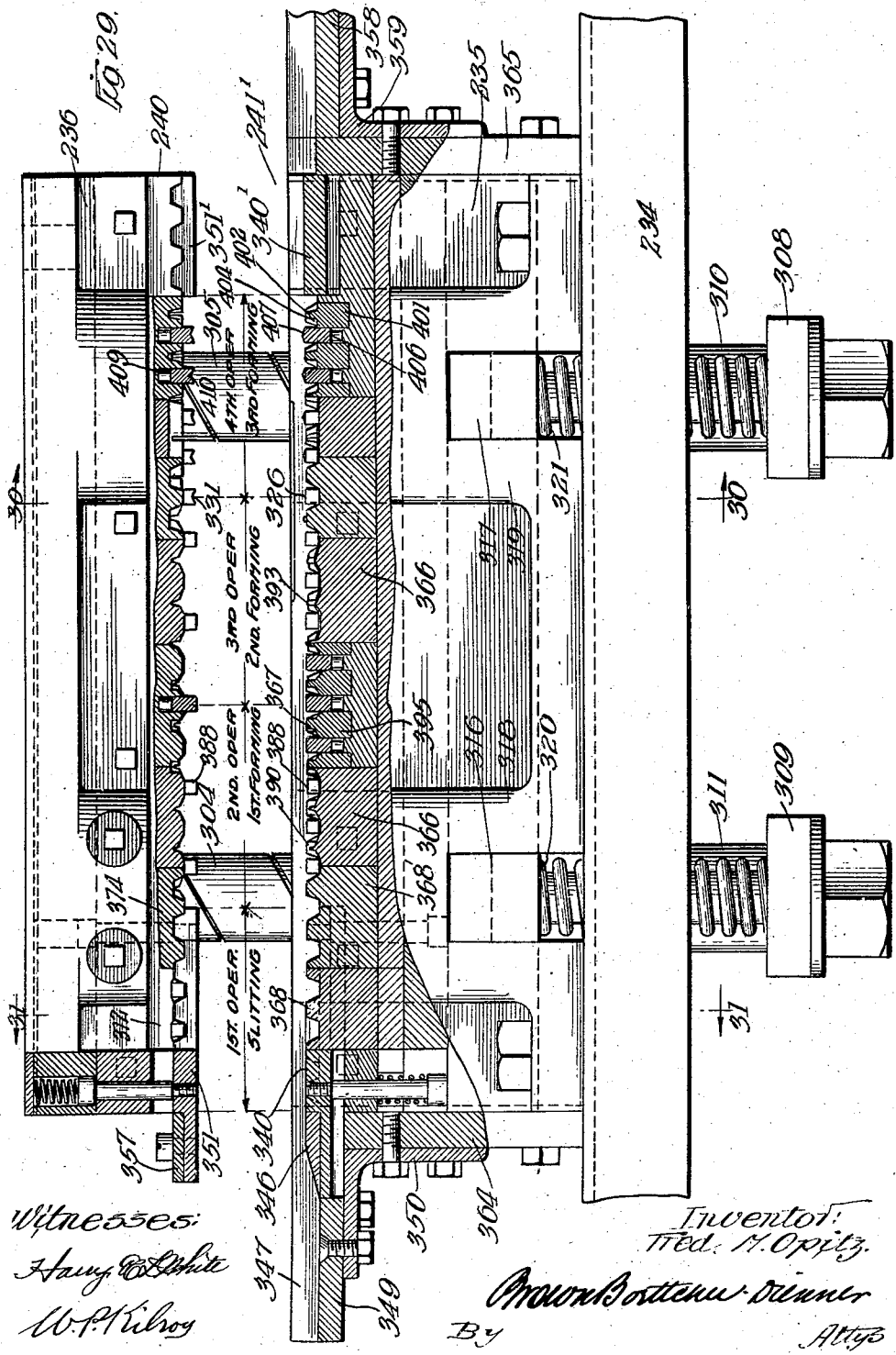

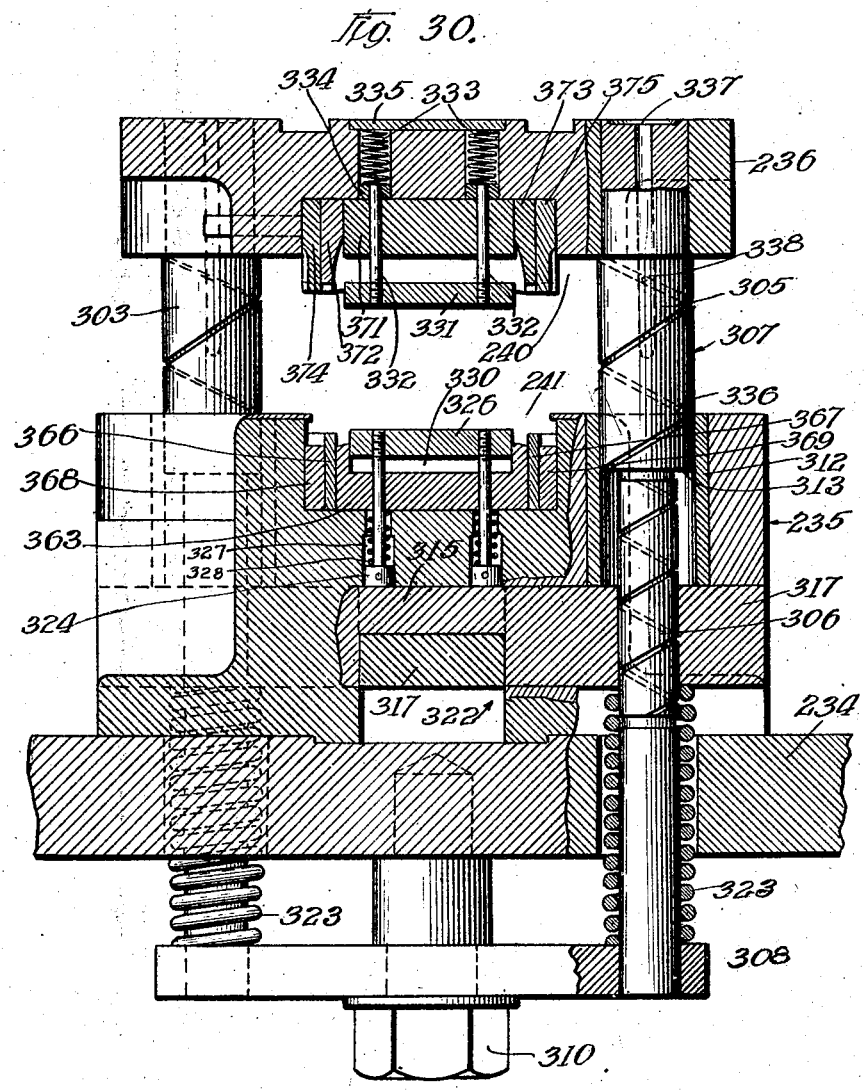

Feb. 22, 1927. 1,618,219
F. M. OPITZ
MACHINE FOR MAKING RADIATOR CORES
Filed May 14, 1923 24 Sheets-Sheet 19
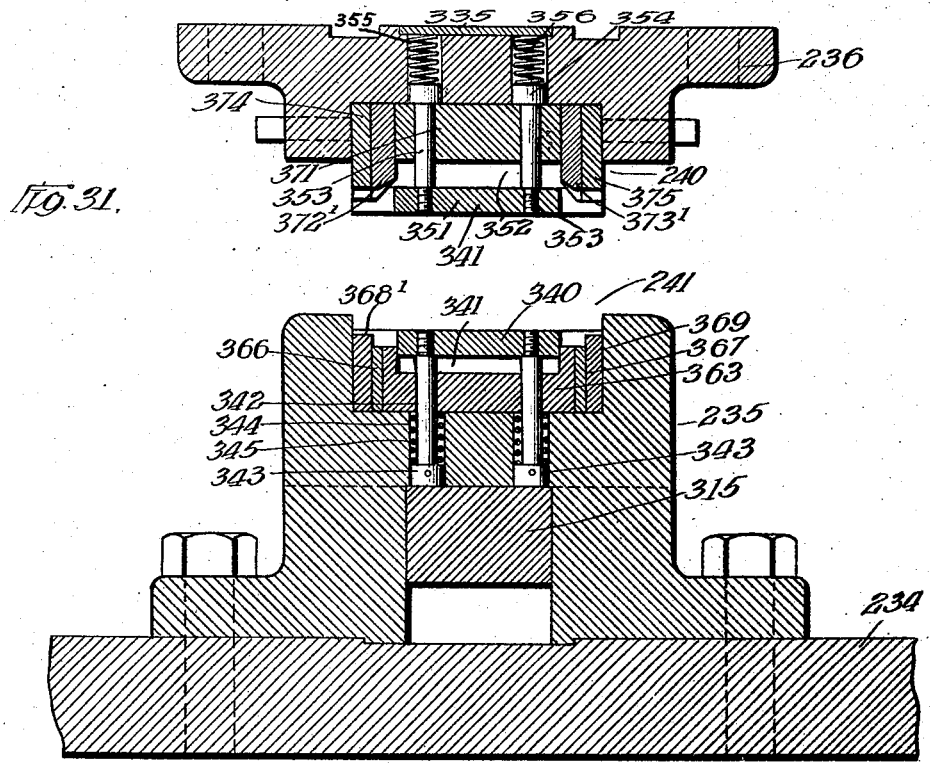
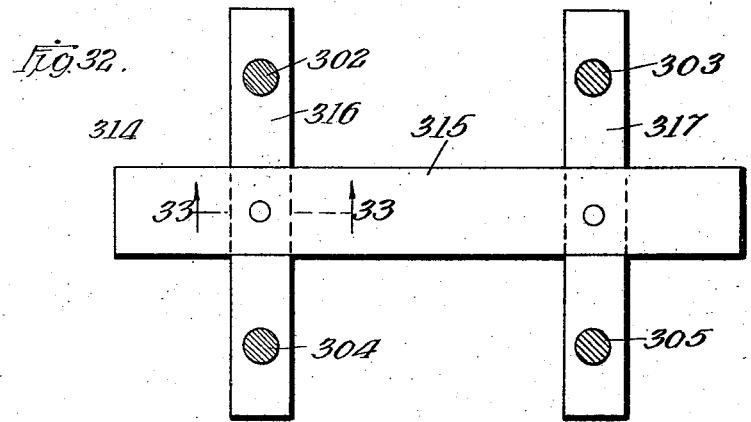
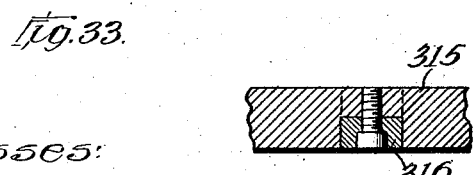
Witnesses:
Harry E. L. White
W. P. Kilroy
Inventor:
Fred M. Opitz.
By Brown Boettcher Dienner
Attys

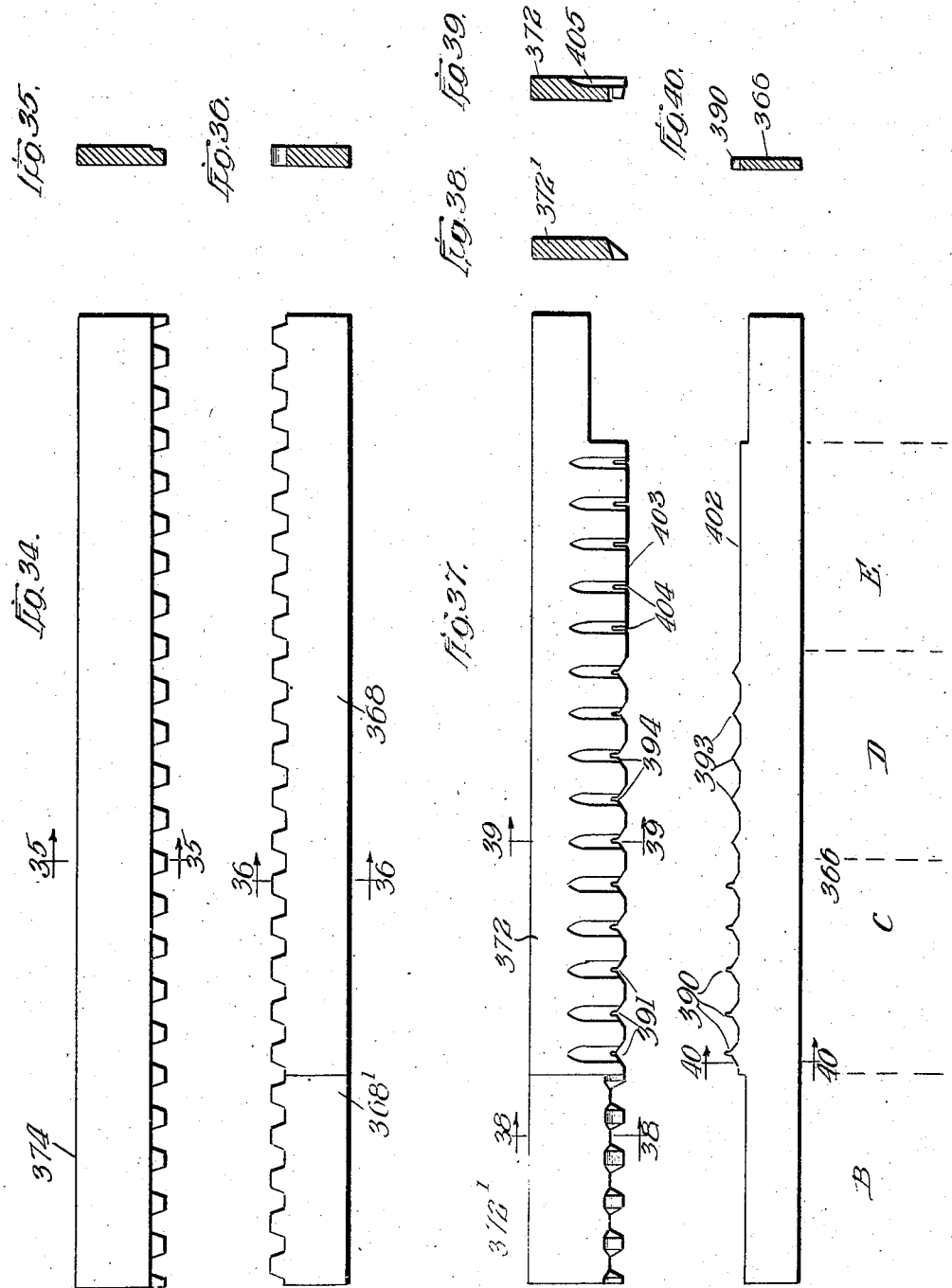

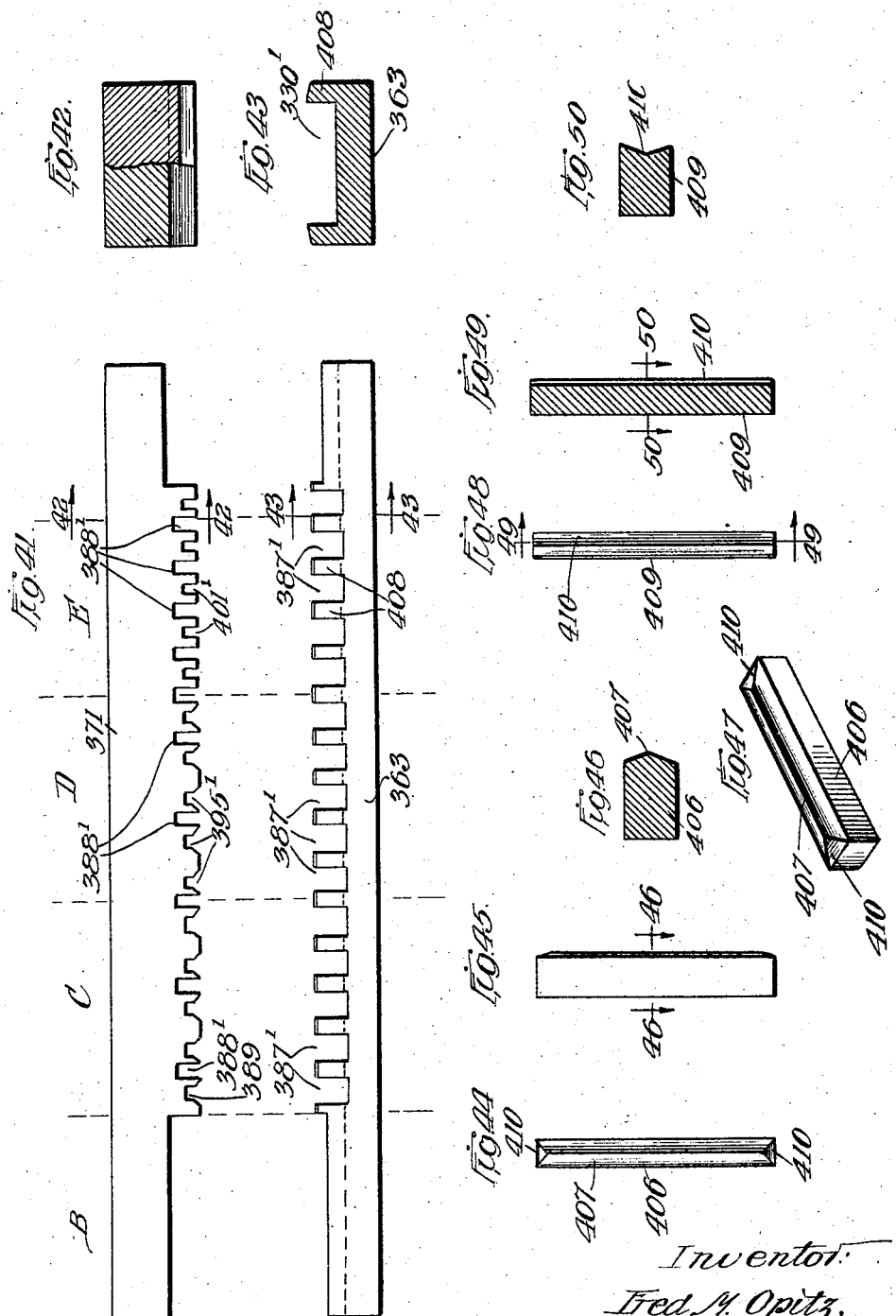

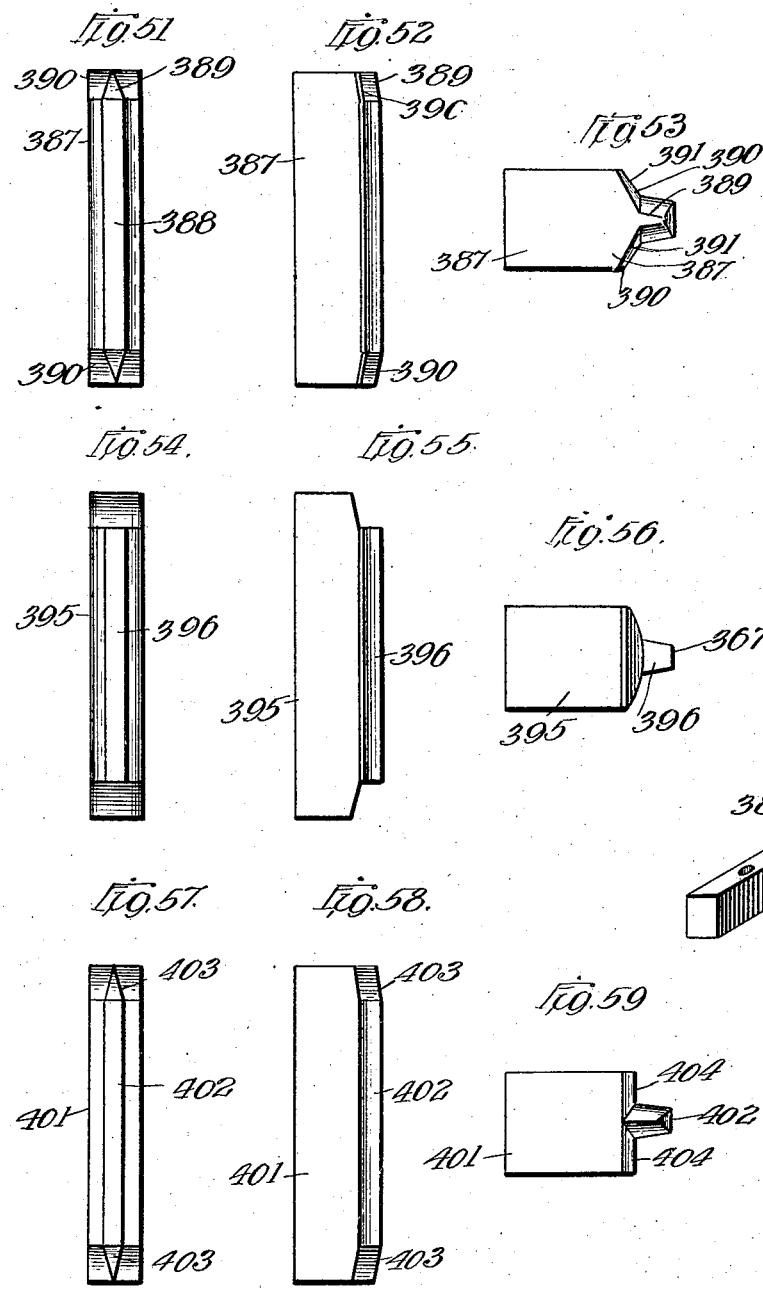

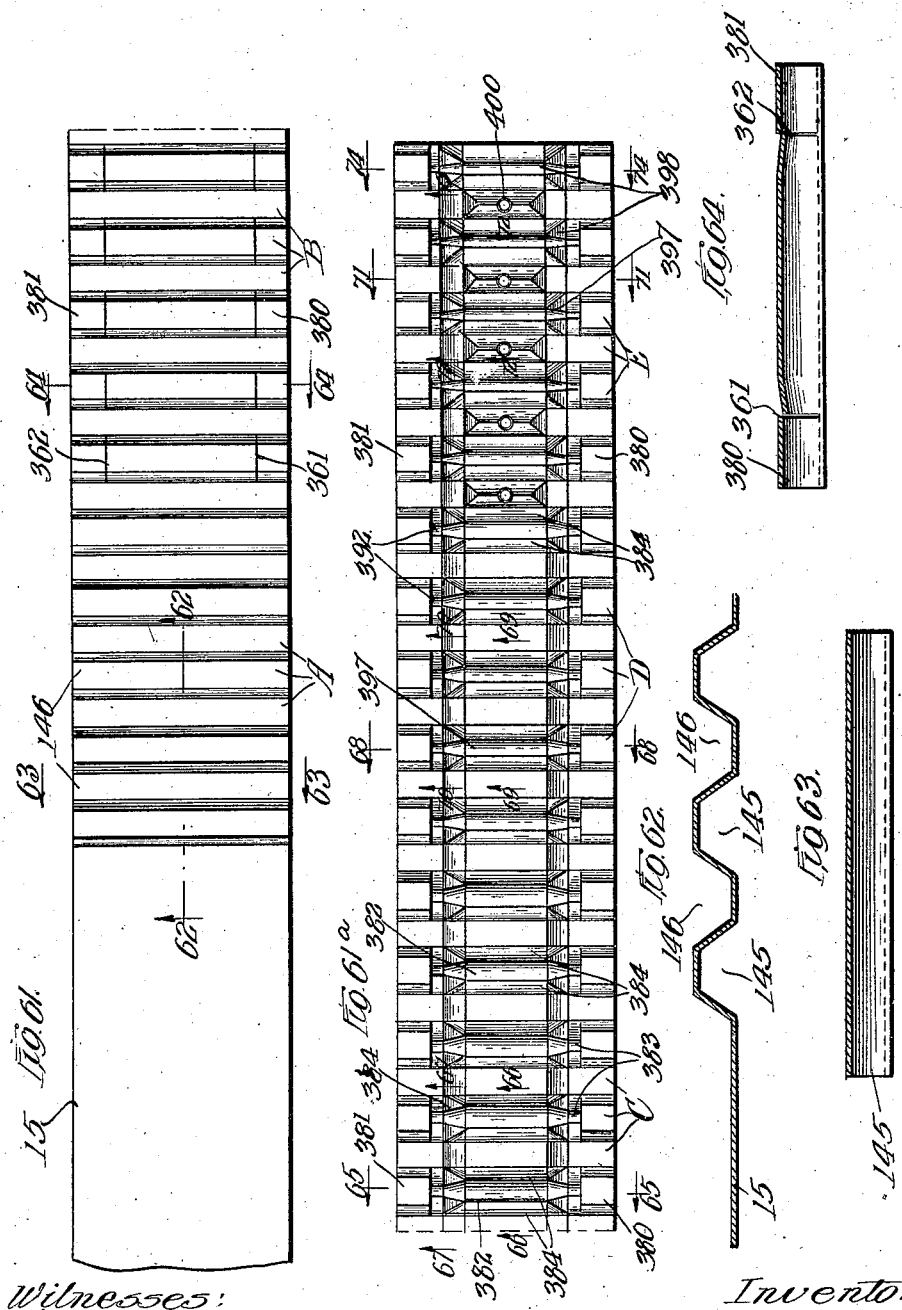

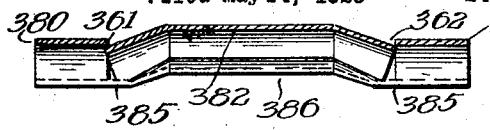
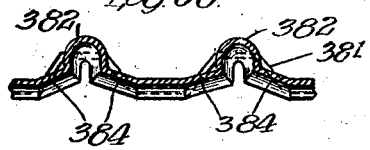
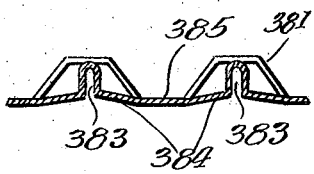
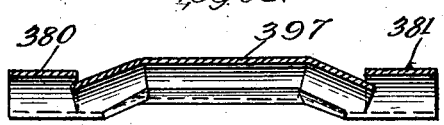
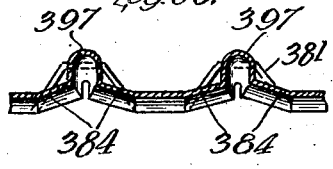
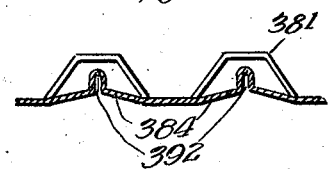
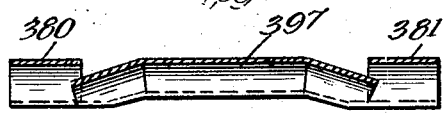
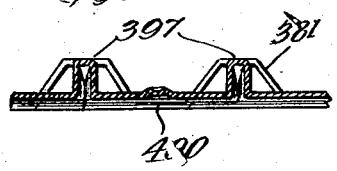
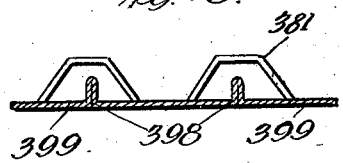
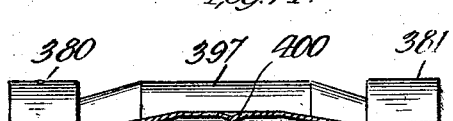

Patented Feb. 22, 1927.

1,618,219

UNITED STATES PATENT OFFICE.

FRED M. OPITZ, OF MILWAUKEE, WISCONSIN, ASSIGNOR, BY MESNE ASSIGNMENTS, TO HEXCEL RADIATOR COMPANY, OF MILWAUKEE, WISCONSIN, A CORPORATION OF WISCONSIN.

MACHINE FOR MAKING RADIATOR CORES.

Application filed May 14, 1923. Serial No. 638,698.

My invention relates to sheet metal working machines generally and more specifically to machines for making sheet metal automobile radiator cores.

Automobile radiator cores of the so-called honeycomb type are now generally made of sheet metal worked into suitable form in strips to form tubes which are variously formed and mounted between the headers of the radiator. The present invention is an improvement in that class of machine which makes or forms the strips of which the radiator tubes are made. While the specific machine which I shall hereinafter disclose and describe is designed to form a particular kind of strip, and consequently radiator core, namely the strip and core disclosed in my prior patent No. 1,404,160 of January 17, 1922, and is designed in doing so to carry out the method of manufacture embodied in my co-pending application Serial No. 599,792, of November 9, 1922, yet I do not intend to limit the present invention to such use only. There are certain aspects of the invention which do not rely upon the specific article manufactured or method of manufacture. Certain combinations and sub-combination are of general use in this and perhaps other arts and I do not wish by the specific description to limit the invention.

In order to acquaint those skilled in the art with the manner of constructing and using my invention, I shall now describe a specific embodiment of the same in connection with the accompanying drawings.

Figure 23:
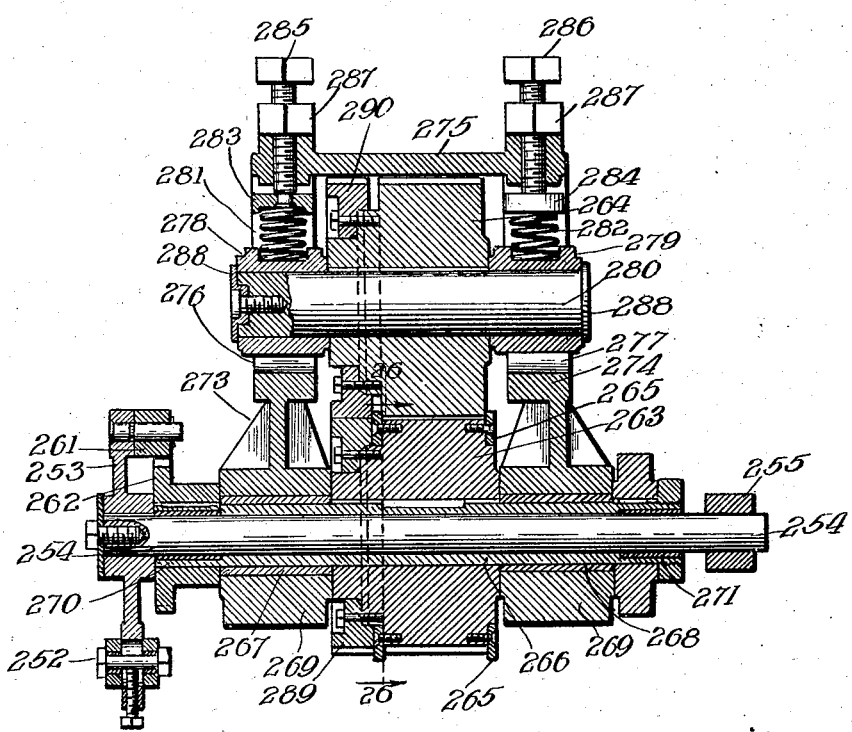
Figure 24:
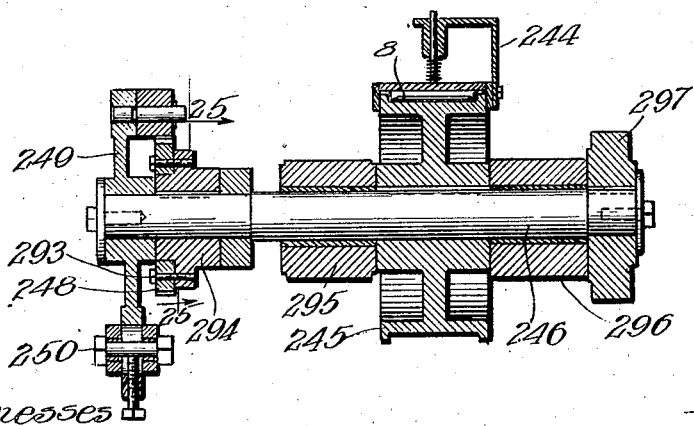

Figure 1, which appears partly on sheet 1 and partly on sheet 2, as Fig. 1ª, shows in front elevation the corrugating machine, a part of the guide running to the forming machine and the winding drum for receiving the corrugated metal from the forming machine. Fig. 1ª, appears on sheet 2 and comprises a front elevational view of the forming machine;

Fig. 2, which appears on sheet 3, is a vertical section through the corrugating machine taken on the line 2—2 of Fig. 1;

Fig. 3, which appears on sheet 4, is a vertical cross-sectional view taken on the line 3—3 of Fig. 2;

Fig. 4, which appears on sheet 5, is a rear elevation partly in section of the corrugating machine taken on the line 4—4 of Fig. 2;

Fig. 5 is a vertical sectional view partly in elevation taken on the line 5—5 of Fig. 2;

Fig. 6, which appears on sheet 6, is a horizontal sectional view taken on the line 6—6 of Fig. 2;

Fig. 7 is a fragmentary sectional view taken through the corrugating rolls on the line 7—7 of Fig. 4;

Fig. 8, which appears on sheet 7, is a fragmentary vertical section taken through one of the corrugating pinions on the line 8—8 of Fig. 3;

Fig. 9, which appears on sheet 7, is a fragmentary horizontal view of the controller handle for the corrugating machine taken on the line 9—9 of Fig. 1;

Fig. 10, which appears on sheet 7, is a fragmentary front elevational view of the same;

Fig. 11, which appears on sheet 7, is a fragmentary horizontal section taken on the line 11—11 of Fig. 10, showing the means for holding the controller handle in selected position;

Fig. 12, on sheet 1, shows a fragmentary front elevational view of the metal passing through the meshing corrugating rolls;

Fig. 13 is a left-side elevational view of the forming machine shown in Fig. 1ª, on sheet 2;

Fig. 14, on sheet 9, is a vertical cross-sectional view of the forming machine taken on line 14—14 of Fig. 1ª;

Fig. 15, on sheet 10, is a fragmentary cross-sectional view of the spring pressed guide for holding the corrugated strip under tension as it is fed into the forming machine;

Fig. 16, on sheet 10, is a transverse section of the same taken on the line 16—16 of Fig. 15;

Fig. 17, on sheet 10, is a view similar to Fig. 15 showing the spring pressed guide for holding the corrugated strip upon the feeding or take-off roll, which feeds the corrugated strip in its process of forming through the forming machine;

Fig. 18, on sheet 10, is a transverse sectional view taken on the line 18—18 of Fig. 17;

Fig. 19, also on sheet 10, is a similar cross-sectional view on the line 19—19 of Fig. 17;

Fig. 20, on sheet 11, is a front elevational view of a modified form of machine in which the corrugating and forming is performed in a single unitary structure;

Fig. 21, on sheet 12, is a left-side elevational view of the machine shown in Fig. 20;

Fig. 22, on sheet 13, is a vertical cross-sectional view taken on the line 22—22 of Fig. 20;

Fig. 23, on sheet 14, is a longitudinal section through the corrugating rolls taken on the line 23—23 of Fig. 20;

Fig. 24, on sheet 14, is a longitudinal sectional view of the feeding roll taken on the line 24—24 of Fig. 20;

Fig. 25, on sheet 13, is a fragmentary sectional view of the adjustable ratchet for the feed mechanism taken on the line 25—25 of Fig. 24;

Fig. 26, on sheet 12, is a similar fragmentary sectional view of the adjustable driving gears for the corrugating rollers taken on the line 26—26 of Fig. 23;

Fig. 27, on sheet 15, is a plan view of the forming die and appears as a section taken on the line 27—27 of Fig. 20;

Fig. 28, on sheet 16, is a similar plan view of the upper forming die appearing as a section, taken on the line 28—28 of Fig. 20;

Fig. 29, on sheet 17, is a transverse horizontal section through the dies;

Fig. 30, on sheet 18, is a transverse cross-sectional view taken on the line 30—30 of Fig. 29;

Fig. 31, on sheet 19, is a similar cross-sectional view taken on the line 31—31 of Fig. 29;

Fig. 32, on sheet 19, is a plan view of one of the spring pressed frames for holding the strip in the dies;

Fig. 33, on sheet 19, is a fragmentary cross-sectional view taken on the line 33—33 of Fig. 32;

Fig. 34, on sheet 20, is a front elevational view of the co-operating racks provided along the edges of the forming dies for holding the margins of the sheet in corrugated shape as they are formed on the corrugating roll;

Fig. 35, on sheet 20, is a cross-sectional view of the upper die member taken on the line 35—35 of Fig. 34;

Fig. 36, on sheet 20, is a similar cross-sectional view, taken on the line 36—36 of Fig. 34 showing a cross-section of the lower die member;

Fig. 37, on sheet 20, is a front elevational view of the next adjacent die member for closing the ends of the slitted parts of the corrugation as will be explained later; and Figs. 38, 39 and 40, also appearing on sheet 20, are cross-sections taken on the respective lines on Fig. 37;

Fig. 41, on sheet 21, is a front elevational view of the central part of the forming die member; and Figs. 42 and 43, on sheet 21, are cross-sections taken on the respective lines on Fig. 41;

Fig. 44, on sheet 21, is a face view, and Fig. 45 is a side view of one of the forming elements adapted to fit into the die shown in Fig. 41;

Fig. 46, on sheet 21, is a cross-sectional view of such a member taken on the line 46—46 of Fig. 45;

Fig. 47, on sheet 21, is an isometric view of the bar shown in Fig. 44;

Fig. 48, on sheet 21, is a face view of a co-operating die member for co-operating with such a member as shown in Figs. 44 to 46;

Fig. 49, on sheet 21, is a cross-sectional view taken on the line 49—49 of Fig. 48;

Fig. 50, on sheet 21, is a transverse cross-sectional view taken on the line 50—50 of Fig. 49;

Fig. 51, on sheet 22, is a front view, Fig. 52. a side view, and Fig. 53, an end view of one of the die members in one stage;

Fig. 54, sheet 22, is a front view, Fig. 55 a side view and Fig. 56, an end view of another die element for a different stage;

Fig. 57, sheet 22, is a front view, Fig. 58, a side view, and Fig. 59, an end view of an element used in the different stage;

Fig. 60, on sheet 22, is an isometric view of one of the knock-out bars for stripping the ribbon out of the dies so it may be advanced;

Figs. 61 and 61ª on sheet 23, show a plan view of the strip of sheet metal advancing through the corrugating rolls. These figures show a part of the sheet plain, the next part corrugated, and a further part slitted ready to form; and thereafter show different stages of the forming operation.

Figs. 62 to 74 inclusive, on sheets 23 and 24, are various cross-sectional views taken on the indicated lines on Fig. 61 showing the construction of the strip in its various stages in the progress through the corrugating and forming mechanism.

I shall now describe in detail first the modification illustrated in Figs. 1 to 19 inclusive on sheets 1 to 10.

The general purpose of this mechanism is, first, to corrugate a strip of sheet metal, this action being performed by the particular mechanism shown in Fig. 1, and thereafter to form the corrugations into a special shape, this being performed by the mechanism shown in Fig. 1ª.

*Corrugating machine.*

The corrugating machine 1, shown in Fig. 1, and the forming machine 2, shown in Fig. 1ª, are driven in synchronism from a common line shaft, a corrugating mechanism 1 operating continuously by continuous rotary motion, and the forming machine 2 operating intermittently by a ratchet or step action. Between the two machines is a curved guide 3 which is in the form of a loop to permit of the synchronism of the continuous feeding motion of the corrugating machine 1 with the intermittent feeding motion of the forming machine 2 without imposing any stresses upon the strip of material running from the first machine to the second. I provide a control handle 4 for the corrugating machine which is placed adjacent the control handle 5 of the forming machine, these two handles being directly under the control of and being placed so near that the operator may have the left hand upon the handle 4 and the right hand upon the handle 5. The operator is preferably seated substantially midway between the two machines so that he can exercise supervision over both and can observe the ribbon of sheet metal as it comes from the corrugating machine and as it passes into the forming machine, and as it again returns to the reel 6 which reel is mounted upon the stand 7, which stand also supports the lower looped portion of the guideway 3. The ribbon 8 as it comes from the forming machine drops down into a track or trough 9 from whence it is led to the take-up reel 6, which take-up reel may be advanced by a suitable friction drive but preferably is operated by hand. The flat ribbon stock is fed off of a roll 10, this roll being supported on a pair of cylindrical rollers 11 and 12 which are mounted at the lower left-hand side of the corrugating machine 1. A suitable guide or shield 13 prevents endwise play of the supply roll 10 on the rollers 11 and 12 and a suitable bracket 14 prevents accidental displacement of the supply roll 10 off of the rollers 11 and 12. As the strip or ribbon 15 is taken from the supply roll 10, there is a tendency for the supply roll 10 to climb over the supporting roller 11, and this is prevented by the brackets 14. The strip or ribbon 15 passes up through a wiper 16 which removes dust and grit and also applies a coating of oil, this wiper being preferably a fibrous pad pressing upon opposite sides of the ribbon or strip under suitable spring tension. From this point the ribbon passes between the tension rollers 17 which afford a small amount of friction so that the ribbon between the said tensioning roller and the bite of the corrugating rollers may have a predetermined degree of tension. The corrugating rollers comprise the larger drum or roller 18 and a pair of smaller drums or rollers 19 and 20. The large corrugating roller 18 bears upon its face or cylindrical periphery, the teeth 21, and the co-operating drums or rollers 19 and 20 have similar teeth 22 and 23. It is to be noted that the teeth 22—21 and 23—21 do not actually contact with each other since their purpose is not to transmit motion to or from each other, but to form the ribbon 15 which passes between them, these teeth being at all times separated by a distance equal to the thickness of the ribbon 15. To keep the forming teeth out of contact with each other, these drums or rollers are coupled together for co-operating action by means of suitable gear wheels which maintain the fixed relation between the corrugating drums or rollers.

The larger roller or drum 18 comprises a central spider or disk 25 having a suitable hub 26 keyed upon the reduced end 27 of the shaft 28. The hub 26 is held upon a cylindrical reduced end of the shaft 27 by means of a threaded locking collar 29 which draws the hub 26 against a shoulder at the rear of the cylindrical portion 27. The roller or drum 18 has an outer flange portion 30 which bears a central ring 31 bearing the teeth 21 and the flange rings 32 which serve to hold between them the ribbon 15 as it enters the bite of the rollers 18—19. The shaft 28 is provided with conical bearings 33 and 34 which may be kept tight and may be adjusted to take up any wear. These bearings are introduced endwise into the central block or frame member 35, which block or frame member is in turn mounted upon the pedestal 36′ as is apparent from Fig. 3. The shaft 28, which as above explained has conical bearing surfaces tapering outwardly, has a reduced portion 36 at its center which is adapted to be embraced by a split ring 37, the two parts of which are adapted to be held in place by the bolts 38 threaded into the same through the block 35. This split bearing ring 37 takes up any endwise thrust of the shaft 28. Suitable adjustment of the conical bearings 33 may be made without displacing the shaft endwise.

The frame block 35 is machined on its lower face and rabbetted as indicated at 40 to secure a firm seat upon the upper co-operating face of the pedestal or machine base 36′. This pedestal or machine base is hollow to lighten the same. At its lower end it is provided with a suitable base flange 41 by which it may be bolted to a foundation or to the floor. The interior of the hollow pedestal or base is accessible through a small door 42.

At its upper end and just below the joining line with the frame block 35, the pedestal or base 36 has a housing 43 containing a cylindrical bore 44 in which is disposed the bearing shell 45. This shell 45 has a laterally extending flange 46 by which it is bolted to the rear side of the housing 43. A hollow driving shaft 47 is mounted through suitable anti-friction bearings 48 and 49 in the bearing shell 45. The inner race of the bearings 49 is clamped between a threaded nut 50 and the shoulder 51. This bearing serves only for the radial load. The inner race of the bearing 48 is clamped between a threaded collar or nut 52 and a shoulder 53 on the shaft 47. A driving pinion 54 keyed to the shaft 47 by a suitable feather key not shown in Fig. 2 is also held in place by the nut 52 between the end of the inner race of the bearing 48 and a shoulder 55 on the shaft 47.

The outer race of the bearing 48 is held between the annular shoulder 56 in the housing 45 and a threaded ring 57 which threads into the open end of the housing or barrel 45. The driving pinion 54 which is keyed to the driving shaft 47 meshes with a large gear wheel 60 which gear wheel is keyed on the cylindrical reduced portion 61 of the main shaft 28. This gear wheel 60 is clamped in place by means of a threaded nut or collar 62. The conical bearings 33 and 34 which co-operate with the double conical shaft 28 are threaded into counterbores formed in the block 35 concentric with the shaft 28.

The main frame block 35 has laterally extending flanges or wings 64 upon the upper ends of which is formed a platform or table 65. This platform or table is machined to provide a pair of guideways 66 and 67 in which are mounted the bases 68 and 69 of bearing blocks 70 and 71. The bases 68 and 69 are confined in the guideways by plates or strips 72 and 73 which overlie the adjacent edges of the bases 68 and 69. These bearing blocks 70 and 71 are adjustable in the guides 66 and 67 by means of lead screws 74 and 75. These lead screws 74 and 75 have bearings in suitable lugs 76 and 77, being held therein against endwise movement by collars 78 and 79. The threaded portion of the lead screws in each case co-operates with a threaded bushing 80 lying in a cylindrical bore 81. The bearing blocks with their lead screws and connected parts are identical, one being mounted left and the other being mounted right. The bearing blocks 70 and 71 each have suitable conical bearing bushings 83 and 84 seating in cylindrical bores in said blocks 70 and 71. These conical bearing bushings 83 and 84 co-operate with double coned shafts 85 and 86 which shafts bear the rolls 19 and 20 respectively. At their central portions the shafts 85 and 86 have reduced portions 87 forming bearing shoulders co-operating with the slip-bearing rings 88 and 89 for holding these shafts 85 and 86 against endwise thrust. This arrangement of thrust bearing is the same as in connection with shaft 28. These thrust rings 37, 88 and 89 are preferably made of bronze. Suitable bolts such as shown at 90 and 91 hold the slip-rings 88 and 89 in place in the bearing blocks 70 and 71. The corrugating rollers or drums 19 and 20 are secured to their respective shafts 85 and 86 by the use of suitable keys as indicated at 92 in Fig. 8, and threaded collars 93 which draw the hubs of the respective drums against suitable shoulders formed on the adjacent ends of the shafts 85 and 86.

At their opposite ends the shafts 85 and 86 have secured thereto by similar collars 94 and keys 95, the hubs 96 of adjustable gear wheels 97 and 98. These gear wheels mesh with the large gear wheel 60 (previously described) and are driven in unison thereby. It will be noted that the gear wheels 97 and 98 are made of two parts adjustably bolted together as by means of the bolt 99, these two parts comprising the inner hub 96 with a flange or web 100 which co-operates with a flange or web 101 extending inwardly from the outer ring part 102. The flanges 101 and 100 are adapted to be clamped together by the bolts 99, the flanges 101 having slots therein to permit adjustment of the teeth of the gear with respect to the shafts 85 or 86 so that the proper driving relation between these shafts may be secured. This is necessary in order to get the proper adjustment of the forming rolls 19 and 20 with respect to the main forming roll 18. The adjustability of the sliding blocks 70 and 71 by means of the lead screws 74 and 75 is desirable particularly for different thicknesses of ribbon 15 passing through these rollers. The forming rolls 19 and 20 may be made identical in which event the forming will be done by the roll 19, that is, the first roll which comes in contact with the flat ribbon 15; or, the two rolls may be made slightly different, one of them giving the sheet and initial corrugation, of slightly different form from the finished corrugation, which finish is imparted by the roll 20.

I have provided housings 104 and 105 at the front and the rear of the corrugating machine for housing the forming rolls and the driving gears respectively. It is desirable to keep any dust or dirt out of the forming rolls just as it is desirable to keep the same out of the gears. The case 104 is shown in front elevation in Fig. 1. It is bolted on to the main frame block 35 as by means of the bolts 106 which bolts surround the bearings of the shaft 28. A cover 107 is bolted by suitable flanges to the case 104 and this cover has an inspection door 108 which is hinged at 109 to the cover. By turning the knob 110, a suitable catch is released as is apparent from Fig. 2, and the cover may be swung outwardly and downwardly so that the operation of the corrugating rolls 18, 19 and 20 may be observed.

The casing 105 is similar to the casing 104 but it embraces in addition the pinion 54 and adjacent part of the driving shaft 47. A suitable cover 111 closes the casing 105, this cover being bolted by suitable flanges to the casing 105. The gear casing 105 is preferably partly filled with a suitable lubricant for lubricating the gears.

The driving shaft 47 is arranged to be driven by belt pulley 113 provided with a suitable friction clutch 114. The pulley 113 has a hub 115 containing a bearing bushing preferably of bronze mounted upon the larger cylindrical portion of the drive shaft 47. Thus when the pulley 113 idles it merely rotates on the cylindrical portion 117 of the shaft 47. The pulley 113 has an inwardly extending friction plate 118 adapted to be gripped between two friction-faced plates 119 and 120 of which the plate 120 is formed integral with the hub 121 and the plate 119 is keyed on said hub 121 for axial movement. The hub 121 is keyed in turn to the driving shaft 47. A cam arm 123 suitably pivoted on the collar 121 is adapted to be thrown outward by the toggle links 124 so as to lock the plates 119 and 120 against the disk 118. The toggle links 124 are pivoted to an axially slidable collar 125 which collar has a flange 126 lying in a split grooved ring or collar 127. The collar 127 has the pins 128 mounted in the fork 129. This fork 129 is secured upon the rear end of a shifting rod 130, which shifting rod lies within the hollow shaft 47. The front end of the shifter rod 130 bears at opposite sides the square cross-head blocks 131 which are pinned to the end of the shaft and which blocks play in the forked end of the lever 132. The lever 132 is keyed to the shaft 133 and this shaft 133 has bearings in a pair of brackets 134 and 135 mounted upon the base 36. The bracket 135 has an extending guard or guide 136 in which there is formed a slot 137. The handle lever 4 has a squared portion 138 which plays in the slot 137. This portion of the lever 4 is provided with a conical depression which is adapted to be engaged by the spring pressed pawls 139–140. Thus the lever 4 is held in a definite and set position, namely, in position to release the friction clutch 114 or in the opposite position to definitely clutch the pulley 113 to the shaft 47.

The top of the gear case 105 and the housing 104 are connected together by a plate 141.

The operation of this unit is as follows: The side of the housing 104 adjacent the tension rollers 17 is open. A suitable supply roll 10 is placed upon the rollers 11 and 12 and the ribbon therefrom is fed upwardly through the wiper 16 and to the tension roller 17 into the casing 104 and into the bites of the rollers 18 and 19. The handle lever 4 is then pulled forward by the attendant and the friction clutch 114 clutches the pulley 113 to the drive shaft 47 which drive shaft transmits its motion through the pinion 54 to the gear wheel 60 and from the gear wheel 60 to the pinions 97 and 98, the gears and pinions holding the co-operating corrugating rolls 18, 19 and 20 in definite relation to each other so that the metal ribbon 15 may be fed through these corrugating rolls and may emerge into the guide 3 in finished corrugated form. Referring now to Fig. 61, on sheet 23, the ribbon 15 is shown at the extreme left as consisting of a plain strip of copper, brass, bronze or the like, and after it has passed through the corrugating rolls it appears as shown at stage A in said figure. The corrugations which are formed are shown in cross-section in Fig. 62. These corrugations 145, 146 are preferably substantially hexagonal in contour, or more strictly speaking, semi-hexagonal, being formed of substantially equal sides and the bends are approximately 120° internal or 240° external. The invention is not limited to making these exact bends or shapes, but the forms I am describing and illustrating are the preferred forms and are forms which I am now making and selling.

For different thicknesses of stock the adjustment of the rolls 19 and 20 with respect to the roll 18 should be varied.

The setting of the rolls 19 and 20 toward and away from the roll 18 is secured by the in and out adjustment of the blocks 70 and 71 towards each other on the ways 66 and 67 which tends to bring the axes of the rollers 19 and 20 closer to the axis of the roller 18. The rollers 19 and 20 may be set so that their teeth synchronize exactly with the teeth on the roller 18. The angular adjustment of the gear wheels 97 and 98 may be changed by releasing the bolts 99 and turning the rims of these gear wheels to the proper position and thereafter clamping them against their co-operating webs on the shaft 85 or 86. Thus by means of these two adjustments I am able to secure angular as well as radial adjustment of the rollers 19 and 20 with respect to the roller 18.

The inward and outward sliding movement of the blocks 70 and 71 on the ways 66 and 67 has two components; first, a radial component which is desired, and second, a circumferential component which has no inherent value. The adjustments of the gear wheel or pinions 98 and 97 with respect to the gear wheel 60 is purely a circumferential or angular adjustment. After the rotary setting at the bolts 99 is once satisfactorily secured, then the adjustment for different thicknesses of metal may be made solely at the graduated lead screws 74 and 75 because the meshing teeth of the gear wheels 60, 98 and 97 maintain synchronism between the corrugating teeth of the corrugating rolls 18, 19 and 20. The slight inward or outward circumferential movement of the gear teeth with respect to each other does not interfere with the proper meshing of these gears since the teeth of these gears are of the involute type and will secure a proper driving ratio even if the pitch diameters are slightly varied. The inner collars of the lead screws 74 and 75 are suitably graduated circumferentially to secure a micrometer adjustment of the bearing blocks 70 and 71 inwardly and outwardly.

Forming machine.

Referring now to sheets 2, 8, 9 and 10, the forming machine 2 is an adaptation of the well known punch press employed however, in continuous operation in conjunction with the corrugating machine 1. This machine comprises a main frame 144 having at its upper end suitable bearings for a crank shaft 145 and lateral ways or guides 146. The crank shaft 145 bears at one end the wheel 147 which serves both as a fly wheel and as a driving wheel for a belt. This wheel is adapted to be clutched by a positive clutch 148 to the crank shaft 145 in the well known manner of a punch press. The clutch is operated by a rod 149 extending down to a lever 150 which lever is in turn operated by a rod 160 connected to a lever 170 which lever in turn is keyed to the rock shaft 171. The rock shaft 171 is provided with a vertically extending arm 172 connected by a horizontal rod 173 to the handle lever 5 lying at the left of the machine 2, as indicated in Fig. 1ᵃ. A suitable guide 174 provided with a stop 175 holds the lever 5 in either the clutching or unclutching position. When the lever is drawn forward as viewed in Fig. 1ᵃ, the clutch 148 is operated to connect the fly wheel 147 with the shaft 145.

At the left-hand end of the shaft 145 there is mounted the usual brake 176 for stopping the movement of the cross-head 177 which cross-head is connected to the crank shaft 145 by the connecting rods 178. The length of the connecting rods 178 is suitably adjusted by screw threaded connections as is well understood by those skilled in the art and a common gear wheel 179 connecting the two threaded parts together so that by operation of the common connected gear mechanism the length of the connecting rods 178 may be shortened or lengthened at will for varying the lowermost position of the throw of the cross-head 177. The crank shaft 145 is provided also with a cam 180 which cooperates with a roller 181 mounted on the end of a rocker arm, this arm being pivoted at its center at 183 and connected at its opposite end 184 to a push rod 185 which reaches down to a crank arm 186 on the rocker shaft 187. This rocker shaft 187 is journaled in bearings 188—189 which are mounted upon the bed of the frame 144. At its forward end as viewed in Fig. 1ᵃ, the shaft 187 bears an arm 190 which is connected to a pull rod 191 and this in turn operates a swinging ratchet arm 192 mounted at the right of the machine as viewed in Fig. 1ᵃ, which ratchet arm is pivoted on the shaft 193. The shaft 193 is pivoted on suitable journals also secured to the bed of the frame 144, and on said shaft is mounted a take-off wheel 194 driven by the ratchet wheel 195 which is engaged by the pawl 196. The pawl 196 is mounted on the arm 192, the opposite end of the arm 192 being connected through an adjustable connection 197 to the pull rod 191. Thus as the cam 180 raises the roller 181, the rocker arm 182 shown in Fig. 13 is moved counterclockwise pushing down on the rocker arm 186 and swinging the shaft 187 clockwise as viewed in Fig. 1ᵃ pulling upon the pull rod 191 and moving the ratchet arm 192 in a clockwise direction to rotate the take-off wheel 194 in the same direction. This take-off wheel 194 is advanced a definite distance for each stroke of the cross-head to move the corrugated and formed strip 8 forward a definite distance to bring a fresh section of the corrugated part under the cross-head and into co-operation with the die members 200—201 which are mounted upon the cross-head and upon the bed plate of the frame 144 respectively. This take-off wheel has formed thereupon the teeth 199 along the margins and has a central recess or groove 198 into which the formed portion of the strip 8 drops.

A spring pressed guide member 202 shown in detail in Figs. 17, 18 and 19, co-operates with the take-off roll 194 to hold the strip properly in mesh with the teeth of the take-off roll so that as the take-off roll is advanced the strip will be fed forward by the proper amount. This guide 202 comprises first a channel 203 upon which the strip rests as it is advanced from the dies to the take-off wheel 194. This channel 203 has the side flanges 204 for confining the strip 8 laterally. A spring pressed top plate 205, which has a tangent straight portion 206 above the channel 203 and a curved portion 207 over the rim of the take-off wheel 194, is normally held yieldingly in position by guides 208—209 and springs 210—211. The guide rods 208 and 209 play in suitable stationary guide members supported by the brackets 212 and 213 which are in turn secured to the sides flanges 204 of the channel 203. The side flanges 204 extend along the side edges of the take-off wheel 194 a sufficient distance to insure good and correct alignment of the strip 8 with the teeth of the take-off wheel 194.

A similar guide and presser plate 215 is mounted at the left of the dies 200—201 on the machine 2 to add a certain amount of tension and to hold the corrugated strip definitely in position as it moves into the bite of the dies. This guide and presser foot 215 comprises a round rod 216 bent into U-shape with the horizontal portion in contact with the top of the metal strip and the vertical legs guided in brackets 217 secured to the guide 3. Suitable coil springs 218 surround the vertical legs of the rod 216 and tend to press the rod into engagement with the tops of the corrugation of the corrugated metal ribbon. The end of the guide 3 adjacent the machine 2 is held in place on said machine by a bracket 219 which is secured to the bed of these machines as is apparent from Fig. 1ª, and Fig. 13. For the purpose of feeding the corrugated strip through the guide and presser 215, the rod 216 may be grasped by the thumb and finger and lifted against the tension of the springs so that the strip may be inserted thereunder. For feeding the finished strip through the guide and presser 202, a suitable handle 220 is provided for raising the plate 205. The main frame 144 of the machine is provided with suitable supporting legs or frames 221—222.

The dies 200—201 which are of particular interest in connection with the formation of the finished strip 8, are of the character illustrated in detail in Figs. 27 to 60 and which will be described in connection with the modified or alternative form of machine shown in Figure 20.

The dies of this machine 2 perform the various operations which result in the finished ribbon illustrated in its various stages in Figures 61 to 74 inclusive. In the particular machine illustrated in Fig. 1ª, I have arranged the pawl and ratchet mechanism to advance the strip 8 a greater distance for each step than in the machine shown in Fig. 20. This is because the dies of the machine shown in Fig. 1ª, finish a greater lineal length of the strip than in the machine shown in Fig. 20. For example, I finish eleven corrugations in the forming machine shown in Fig. 1ª, whereas in the smaller machine of Fig. 20, I finish five corrugations of the strip. Thus for the same speed of motion of the dies the machine shown in Fig. 1ª, will finish eleven units of length while the machine in Fig. 20 is finishing five units of length. This may, however, be varied.

The machine shown in Fig. 20 combines the operation of corrugating and forming, being in all material respects a duplication of the machine 2 with the important addition, however, of corrugating mechanism.

*Combined corrugating and forming machine.*

The combined corrugating and forming machine shown in Fig. 20 comprises a main frame member 225 having bearings at its upper end for the crank shaft 226, this crank shaft having mounted thereupon a driven fly wheel 227 which is adapted to be clutched to the crank shaft by a suitable clutch 228 such as is commonly employed in punch presses for positively engaging the wheel and the shaft at a predetermined position and for disengaging the parts at a similar predetermined position. A suitable brake 229 is provided on the left end of the crank shaft for stopping and holding the crank shaft and connected parts when the wheel 227 is declutched. The crank shaft 226 is connected by a suitable connecting rod 230 to a cross-head 231 movable on the guides 232 as is well understood by those skilled in the art. The frame 225 has a platform or bed plate 233 upon which rests the pillow block or subframe 234 for supporting the lower die frame member 235. The upper frame member 236 which corresponds to the lower die frame member 235 is secured to the cross-head 231, through the medium of a similar pillow block or punch holder plate 237. The upper and lower die members 240 and 241 are mounted in the frame members 236 and 235 respectively.

The pillow block or subframe 234 extends laterally at each side beyond the ends of the bed plate member 233 and upon the left-hand side as viewed in Fig. 20, supports the corrugating mechanism 242 and supports at the right-hand the take-off and feeding mechanism 243. A spring pressed guide and presser foot mechanism 244 which is in all material respects similar to the guide and presser foot 202 shown in Figs. 17 to 19 inclusive, co-operate with the take-off mechanism as heretofore described. This take-off mechanism includes the take-off wheel or drum 245 mounted on a shaft 246 and advanced by means of the pawl 247 and ratchet wheel 248. The pawl 247 is mounted at the upper end of the arm 249 which is pivoted at its central part on the shaft 246 and is connected by an adjustable leverage connection 250 with a pull rod 251 which pull rod is in turn connected by an adjustable connection 252 to a similar ratchet arm 253 keyed on the shaft 254. The shaft 254 is rocked by means of a lever arm 255 keyed to said shaft 254, this rocker arm 255 being connected by push rod 256 to the rocker arm 257 which bears the roller 258 pressed against cam 259 on the shaft 226. The springs 260 tend to hold the rocker arm 257 against the cam 256 and make the return throw of the shaft 254 and connected parts.

The arm 253 bears a pawl 261 which co-operates with the ratchet 262 in the same manner and at the same time as the pawl 247 co-operates with the ratchet 248 as the shaft 254 is rocked. The advance of the ratchet wheel 262 results in an intermittent action of the corrugating mechanism 242.

Corrugated mechanism.

The corrugating mechanism 242 comprises two corrugating rolls 263—264 between which the strip 15 passes intermittently as it is advanced into the die mechanism. The operation of corrugating by these rolls occurs during the time that the dies are separated preferably upon the return stroke of the cross-head 231. The corrugating roll 263 is made wider than the roll 264 for the purpose of seating the flange rings 265 which lie upon opposite end of faces of the roll 263. The roll 263 is keyed to a sleeve 266 which is mounted in suitable bearings 267 and 268 in the brackets 269 forming an extension on the pillow block 234. The rock shaft 254 similarly has bearings 270 and 271 in opposite ends of the sleeve 266. Suitable side frame members 273 and 274 are clamped to the brackets 269 and the side frame members are connected at their upper ends by a top piece 275. The side frame members 273—274 having sliding ways 276—277 for mounting the floating bearing boxes 278—279 which support opposite ends of the shaft 280. The upper corrugating roller 264 is keyed to said floating shaft 280. The boxes 278—279 are pressed downwardly yieldingly by springs 281—282, these springs being compressed between suitable pads 283—284 and the boxes 278—279 by means of the adjusting screw 285—286, held in place by lock nuts 287.

The shaft 280 has flanges upon its ends as indicated at 288 and the hub of the roller 264 occupies the space between the inner edges of the boxes so that there is no endwise play of the shaft or of the roller. The rollers 264 and 263 do not drive each other through the corrugating teeth but instead are provided with gear rings 289 and 290 having meshing involute teeth for transmitting the drive from one roller to the other independently of the corrugating teeth. These gear rings have inwardly extending flanges which are clamped by bolts passing through slotted holes therein to the adjacent hubs of the rolls 263 and 264 so that an independent drive from the one shaft to the other may be secured. The slotted holes 292 through which pass the bolts 293 permit of suitable adjustment of the teeth of the ring gears with respect to the teeth of the corrugating rolls so that they will be strictly in synchronism. The radial position of the rolls 264 and 263 with respect to each other is maintained by the pressure of the springs 281 and 282. The teeth on the ring gears 289—290 are of such a character as to permit radial play of a suitable degree without changing the driving ratio or relation between them.

The advancing of the strip 15 between the rolls 263—264 is controlled in synchronism with the take-off of the formed strip from the die. In order to secure accurate adjustment so that the two ratchets will be fed in synchronism, the ratchet wheel 248 for the take-off wheel 245 has slotted bolt holes 292 through which suitable clamping bolts 293 connect this ratchet wheel with the flange of a hub member 294 which is keyed to the shaft 246.

The shaft 246 is mounted in bearings 295 and 296 which form a continuation of the pillow block 234 similar to the bearings for the corrugating roll. At its rear end the shaft 246 is provided with a driving pulley 297 which is connected by a belt drive or other suitable friction connection to the take-up reel 298 which receives the finished strip 8.

The stopping and starting of the machine is controlled by means of a pedal 299 on the lower cross shaft 300. This pedal may be locked in depressed position by the manually controlled catch or handle 301.

Forming dies.

I shall now describe in connection with Figs. 27 to 33 inclusive appearing on sheets 15 to 19 the general construction of the die mechanism and thereafter shall discuss in detail the specific construction of the same in connection with Figs. 34 to 60 inclusive on sheets 20 to 22 inclusive.

The length of the metal ribbon after it is corrugated, that is, passed through the corrugating rolls 263—264, is not changed in the forming operation. However, four successive steps are involved in changing the strip from the corrugated form to the finished condition. These four steps comprise a slitting operation and three forming operations. The dies are therefore made of a corresponding length equivalent to twenty corrugations, that is, five corrugations per step and four steps. The pawl and ratchet mechanism which advances the strip through the forming dies advances the strip through the dies one step at a time or a distance equal to five corrugations. The corrugating rolls and the take-off roll are so positioned that the strip running between them in a straight line lies just out of contact with the top of the lower die 241 and means is provided for lifting the strip out of the forming die corrugation when the upper die rises so as to permit the next feeding operation to shift the strip without having to pull the same out of the die. That is to say, the dies are so arranged as to eject the strip so that it may be fed forward without damage. The upper die frame 236 has secured thereto four depending guide rods or posts 302—303—304—305. These posts have reduced ends set into and secured to the upper die frame member 236 and they have reduced lower ends 306 below the main guiding portion 307 which reduced lower ends extend down through the pillow blocks 234 out of contact therewith and into guide bars or spring pads 308 and 309 which are clamped upon studs 310—311 respectively. The upper guiding surfaces 307 fit into bushings 312 as shown in Fig. 30, these bushings preferably being hardened steel and being set into the lower frame member 235. The shoulders 313 formed below the bearing portion 307 on each of the four posts or guiding rods, are adapted to engage a knock-out or ejector frame 314 as shown in Fig. 32. This frame comprises a central longitudinal ejector bar 315 and two cross pieces 316—317. These cross pieces 317 and 316 are disposed in suitable housings 318 and 319 providing vertical guides 320 and 321, and the longitudinal ejector bar 315 lies in a longitudinal channel 322 having suitable guiding surfaces along its side for guiding the bar 315 vertically. Coil springs 323 are disposed between spring pads 308—309 and the cross pieces 316—317 so that the stripping or ejector frame 314 is normally held in its uppermost position being depressed only when the shoulders 313 on the posts or guiding rods press down upon the cross bars 316—317 and depress the entire frame. The longitudinal bar 315 engages, for example, the heads 324 of pins 325 (see Fig. 30, sheet 18,) which are threaded into knock-out or ejector bars 326 for raising the sheet metal ribbon out of the corrugations of the dies to raise the same into position to be shifted forward. The heads 324 are guided in suitable bores 327 formed in the frame member 235 and suitable coil springs 328 tend to hold the heads 324 into engagement with the longitudinal bar 315 of the ejector frame. It will therefore be seen that as the upper die frame member 236 with its posts 303—304—305—306 descends until the shoulders 313 strike the cross bars 316—317, the ejector bars 326 are all in raised position, and as the frame 314 descends, these ejector bars 326 sink into the corresponding recesses 330 formed in the lower die member 241.

The upper die member 240 has yielding presser and ejector bars 331 mounted upon a pair of pins 332 and depressed by springs 333, these presser bars 331 coming down in advance of the die proper and holding the strip against the stripper bars 326 and serving also to strip the ribbon clear of the upper die. The pins 332 have heads 334 lying in suitable bores in the upper die frame member 236, these bores being closed by a cover plate 335 for retaining the springs 333 in position.

The cylindrical guide rods such as 305 are provided with helical oil grooves as shown in Fig. 30, these oil grooves communicating through transverse parts 338 with central oil passageways 337 opening in depressions in the upper ends of each of the rods.

Referring now more particularly to the section taken on line 31—31 as shown in Fig. 31, it will be seen that individual ejector bars are not employed in the forward part of the die where the slitting operation is performed, but that instead there is on the lower die an ejector or knockout plate 340 which is guided in a suitable recess 341 in the front part of the lower die member 241 and which has the four guiding pins 342 with their heads 343 resting upon the longitudinal bar 315 and having springs 344 lying in the bores 345 above the heads 343.

The forward end of the plate 340 has a cross member 346 extending across the front part of the said plate and lying in the notch therein. This cross bar 346 bridges the entire space between the side flanges 347—348 which are formed upon the channel or guide member 349. This guide member 349 is attached to the frame member 235 by means of the angle bracket 350. The rise and fall of this ejector plate 340 is controlled in the same manner as the rise and fall of the ejector bars 326 heretofore described. On the upper die member there is a co-operating hold-down or presser plate 351 likewise lying in a central recess 352 and guided upon four pins 353, these pins being provided with heads 354 lying in the bores 355 and having springs 356 lying between said heads 354 and the cover plate 335. At its forward end this hold-down or presser plate 351 is provided with a cross member 357 which extends the full distance between the guiding shoulders 347 and 348 and is adapted to lie between them when the dies are closed. It will be seen that the cross bar 346 on the lower ejector plate 340 has an inclined front edge so as to facilitate the drawing of the corrugated strip across the same. A guide 358 similar to the guide 349 is mounted by means of an angle bracket 359 at the rear of the die frame member 235 and serves to deliver the finished strip to the take-off wheel 245 through the spring pressed plate 244. The rear ends of the dies are provided with ejector and hold-down plates 340' and 351' performing the same functions as the corresponding parts at the front end of the dies.

Now, in order to explain in detail the construction and mode of operation of the dies proper, I shall refer to certain specific elements shown in Figs. 34 to 60 inclusive and shall refer to the various stages of the ribbon in its passage through the dies as illustrated in Figs. 61 to 74 inclusive.

*Detail description of the forming die.*

The first stage after the corrugation which is indicated at stage A in Fig. 61, and which corrugating is performed in the rollers, comprises the step of slitting across the tops of the corrugations 145 as indicated at 361 and 362 a short distance from the edge or margin of the corrugated sheets to leave loops 380 and 381. This slitting operation is performed in that part of the dies which is indicated as the first operation on Figs. 27, 28 and 29 (see sheets 15, 16 and 17).

Referring now to the bottom die shown in plan view in Fig. 27 and the cross-sections of the same shown in Figs. 30 and 31, the lower die member 241 is built up of a compound structure comprising the central or main die section 363 which extends for the full length of the die between the end plates 364 and 365. Next to the central die 363 and upon opposite sides thereof, there are thin longitudinal strips 366—367 for collapsing the slitted ends of the corrugations, and outside of these two strips there are two rack bars 368—369. These strips and bars are the same length as the central part 363 and are all held between the end plates 364 and 365 in the central channel of the die frame member 235. The central member, the strips and the bars are all clamped together laterally by the set screws 370.

The upper die member 240 is made up somewhat in the same manner of a central longitudinal member 371, then an adjacent pair of side bars 372—373, and then two outer rack bars 374—375.

The slitting operation for making the slits 361 and 362 in the first operation in stage B is performed by the front portion 372' of the upper die member on one side in co-operation with the front portion 368' of the lower die member on the same side. These two parts are set in line with each other so that they shear off the top and adjacent side portions of the corrugations 145. These particular parts which perform the shearing operation are made of tool steel and are therefore made of separate pieces from the other parts of the racks or bars which are made of machine steel. Since in the first operation or stage B the dies do not perform any work upon the central part of the strip, the central part of the die members in the first operation is merely recessed to receive the knock-out plate 340 and presser or hold-down plate 351. The second die operation which is the first forming operation and corresponds to stage C on the strip brings the strip to the condition shown in Figs. 65 to 68 inclusive (see sheet 24).

In this stage, the outer marginal parts 380—381 beyond the slits 361—362 are left unchanged as they remain throughout the operation whereas the central part is compressed laterally and raised as indicated at 382 and the outer ends of the slitted central portion are pressed together as indicated at 383. At the same time the bottom wall along the outer portion 383 is bulged upward as indicated at 384 above the plane of the intermediate portion 385 which remains in the same position with respect to the marginal portion 380—381 as it was before. The central part is, however, pressed upwardly to form a gutter to form the necessary water channel when two of such strips are finally placed in contact with each other.

The raising of the top of the central part as indicated at 382, and the bringing together of the end part 383 is performed by means of the die blocks shown in Figs. 51, 52 and 53. These die blocks 387 are formed with a central bar 388 which has the tapering ends 389 for forming the pinched-together ends 383. It will be noted that the end of the main part of the block 387 on its front face as indicated as 390 and the adjacent diagonal parts 389 are tapered downwardly in order to form the sloping shoulders of the channel. The adjacent side walls 384 which have been thrust up with the corrugations 382, are so formed by the tapering shoulders 391 upon the sides of the blocks 387. These blocks 387 are set into the notches 387[1] and are held in the corresponding notches 387[1] by suitable machine screws not shown. The co-operating upper portion of the central die member 371 contains knockout bars 388 lying in transverse grooves 388[1]. The die blocks 387 co-operate with female die parts formed in the shape of transverse grooves 389 in the central die member 371 (see Fig. 41). The side bar members 366 and 368 have upwardly projecting die members 390 which project into corresponding female die parts 391 formed in the upper side strips 372 and 373. The function of these parts 390 and 391 is to close together the slitted ends as indicated at 383 in Fig. 67, and they also produce the upward bending of the walls 384 as shown in Fig. 67. In the second forming operation or stage B, the slitted ends are brought somewhat closer together and reduced in size as indicated at 392 in Fig. 70. The adjacent wall at the base of these pinched-together parts indicated at 384 is left substantially in the same position as before. The projections 393 on the side strips 366 and 367 do not have the sharp upward forming point shown at 390. However, the co-operating upper die strips 372 and 373 have reduced notches 394 for compressing the pinched ends 392. The central part of the dies comprises blocks such as indicated at 395 in Figs. 54 to 56 inclusive. It will be seen that the configuration of these blocks is generally similar to that of the blocks 387, with the exception that the width of the projecting part 396 is less and the corresponding central corrugations 397 as shown in Figs. 68 and 69 is also reduced in width. The tapered end portions have been omitted since no forming of these parts is now necessary, the side walls of the transverse corrugations being pressed together and the bottoms restrained from movement so that the strip is left in the condition shown in stage B in Fig. 61. The die blocks 395 are seated in the transverse grooves 387' just as were the blocks 387, being fastened in by suitable machine screws from the bottom side. The knock-out blocks such as 388 are mounted in the transverse grooves 388¹ in the upper die member 371. The transverse female parts which co-operate with the blocks 395 indicated at 395¹ are of a corresponding width so as to secure reduction of the width of the corrugations 397.

In the final stage the central parts of the corrugations are finally formed and the ends are closed together. The central transverse corrugations 397 are squared up and brought to the same level as the original corrugations which prevail at the margins 380 and 381 as may be seen from Fig. 72. At the same time the bottom walls are flattened down, this serving to close the ends 398 as indicated in Fig. 73, so that they may be readily sealed by dipping in solder as is explained in my co-pending application Serial No. 599,792, filed November 9, 1922. At the same time that the walls 399 on opposite sides of the ends of the corrugations are depressed to close the ends at 398, there is provided a slight take-up of the surplus stock at the central part of the corrugation by striking up a slight ridge 400 as indicated in Fig. 72. The purpose of this is to make certain that the ends will be closed at 398 when the walls indicated at 384 adjacent the central parts of the corrugations are flattened down. I secure this closing of the ends by the flattening down of the metal and without any actual pinching of these ends by external means.

To secure this final forming and closing operation, I provide die blocks 401 having the central projecting part 402 and the triangular end part 403 with flat shoulders as shown at 404 to bring the side walls adjacent the corrugations into the same plane. It will also be noted that the ends are tapered off to retain the trough or gutter shape 386 for forming the tube half. The die blocks 401 are seated in the last position E of the cross grooves 387¹ in the lower die member 363. The corresponding upper matrix forms comprise narrower grooves 401¹ for bringing the corrugations 397 to the final form. It will be noted that the shoulders adjacent the transverse grooves 401¹ are square and all lie in the same plane to co-operate with the shoulders 404 of the lower die blocks 402.

The side strips 366 and 367 on the lower die member provide the plane surface 402 to bring the adjacent walls as indicated at 399 all into the same plane. This portion 402 co-operates with the portion 403 on the upper strips 372 and 373. The co-operating portion of the upper strips 372 and 373 comprises the narrow grooves 404 for receiving the closed ends 398 of the transverse corrugations. It will be noted that the metal is milled away adjacent the notches 391, 394 and 404, as is indicated at 405 in the cross-sectional view of Fig. 39. This is done to confine the operation of closing the ends to a relatively small marginal portion at the end of each corrugation.

The knock-out bars 406 form in addition to their knock-out function die faces on their upper surfaces, the die face 407 comprising a relatively obtuse dihedral angle for forming the folded up part 400 as shown in Fig. 72. These knock-out and die bars 407 are seated in line with the projections 408 being less in width than the width of the central piece 363 and lying directly in line with the said projection as will be apparent from Fig. 29. The upper knock-out bars 409 which are mounted in grooves 388¹ in position E have grooved or recessed die faces 410 corresponding to the protruding die faces 407 of the blocks 406. It is between the die faces 407 and 410 that the slight fold or fullness is formed for taking up the surplus metal when the central part of the strip is flattened down. The ends of the projecting face 407 are chamfered off as indicated at 410 in Fig. 47. The co-operating knock-out blocks which lie in the central groove 330 are well illustrated in Fig. 30. In Fig. 30, the knock-out block 326 is one particular bar of the lower group in the stages C and D.

It is thought that the operation of the device will be apparent from the above detailed description.

The manner of employing the strip to make up the radiator is fully explained in my co-pending application above referred to.

I do not wish to be limited to the precise details shown and described.

I claim:—

1. In combination, a pair of rotary corrugating rolls for corrugating a strip of sheet metal, and co-operating reciprocating forming dies for forming a portion of said strip into a gutter with closed-ended transverse corrugations along its side.

2. In combination, rotary corrugating mechanism for corrugating a strip of sheet metal transversely, reciprocating forming dies for forming the corrugated sheet into a gutter or half tube, and means for operating said rolls and said dies and delivering the corrugated sheet from the rolls to the dies.

3. In combination, corrugating means for corrugating a strip of sheet metal, slitting means for slitting across the ridges of said corrugations, forming means for closing together the edges of the metal inside of said slit, said forming means being adapted to form the corrugated strip into a channel or half tube.

4. In combination, a pair of corrugating rolls, a take-off roll, die members between the corrugating rolls and the take-off roll, common means for first closing the die members upon the strip passing between the corrugating rolls and the take-off roll and for thereafter simultaneously advancing the corrugating roll and the take-off roll when the die members are separated.

5. In a machine of the class described, a main frame having a crank shaft, a cross-head guided on the main frame, a connecting rod between the crank shaft and the cross-head, said main frame having a platform in line with the cross-head, a transverse die frame on said platform, die members mounted on said cross-head and on said die frame respectively, transverse bearings at the end of the die frame, a take-off shaft mounted in one of said bearings, a take-off roll on said shaft, a ratchet mounted on said shaft for advancing said take-off roll, a swinging pawl arm bearing a pawl engaging said ratchet, a hollow corrugating roll shaft in the bearings at the opposite end of the die frame, a corrugating roll mounted on said hollow shaft, a co-operating corrugating roll journaled adjacent said first roll, means for driving said rolls in unison, a ratchet wheel for driving said first corrugating roll, an axial shaft passing through said hollow shaft and bearing a pawl arm having a pawl for engaging said last named ratchet, a connection between both of said pawl arms, and cam means on the main shaft for rocking said last named pawl shaft.

6. In combination, a frame, bearings in said frame, a hollow shaft in said bearings, a corrugating roll mounted on said shaft between said bearings, frame members mounted on said bearings providing guides, journal boxes in said guides, a floating shaft in said journal boxes, a corrugating roll on said floating shaft adapted to co-operate with the first named corrugating roll, driving means for driving said rolls independently of the corrugating teeth thereupon, said driving means being angularly adjustable, spring means for said journal boxes to maintain the corrugating rolls and the gears in meshing relation, and means for driving said hollow shaft.

7. In combination, a frame, bearings in said frame, a hollow shaft in said bearings, a corrugating roll mounted on said shaft between said bearings, frame members mounted on said bearings providing guides, journal boxes in said guides, a floating shaft in said journal boxes, a corrugating roll on said floating shaft adapted to co-operate with the first named corrugating roll, driving means for driving said rolls independently of the corrugating teeth thereupon, said driving means being angularly adjustable, spring means for said journal boxes to maintain the corrugating rolls and the gears in meshing relation, and means for driving said hollow shaft, said means comprising a ratchet wheel mounted on one end of the hollow shaft, a rocking shaft passing through said hollow shaft and bearing a pawl arm having a pawl co-operating with said ratchet wheel.

8. In combination, a pair of corrugating rolls, gears connecting said rolls for driving the same, said gears being angularly adjustable with respect to the rolls, bearing means for said rolls, said bearing means being adjustable towards and away from each other, a take-off roll, a shaft for said take-off roll, driving means for driving the corrugating rolls and the take-off roll simultaneously, and an angularly adjustable connection in said driving means for adjusting the angular position of the take-off roll with respect to said corrugating roll.

9. In combination, a main corrugating shaft, a floating corrugating shaft, corrugating rolls on said shafts, gears for driving said rolls with respect to each other, a take-off roll, common actuating means for the main corrugating shaft and for the shaft of the take-off roll, and adjustable connection for angularly adjusting the position of the take-off roll with respect to the corrugating rolls.

10. In combination, a frame member having bearings, a hollow shaft through said bearings, side frames rising from said bearings, said side frames providing guides, floating journal boxes in said guides, a floating shaft in said journal boxes, a corrugating roll on the hollow shaft, a co-operating corrugating roll on the floating shaft, said rolls having hub members, driving gears for said rolls having means for clamping said gears to the hubs of said rolls, said means permitting of angular adjustment of the gears with respect to the rolls, a ratchet wheel on one end of the hollow shaft, and a rock shaft passing through said hollow shaft and having a pawl arm and pawl co-operating with said ratchet wheel.

11. A pair of corrugating rolls having laterally extending drums, flange rings on one of said rolls extending over the meshing teeth of the corrugating rolls for confining a metal ribbon between them, ring gears for transmitting driving motion between said rolls, said ring gears having inwardly extending flanges adapted to cooperate with the hubs of the corrugating rolls, clamping bolts passing through said flanges and into said hubs, one of said ring gears having slotted holes for receiving said bolts to permit of angular adjustment of the gears with respect to the rolls.

12. In combination, a pair of die members, means for reciprocating said die members towards and away from each other, means for feeding corrugated metal strips between said die members, said die members being adapted to form the intermediate portion of said corrugated strip, a take-off mechanism comprising a drum having toothed flanges for engaging the corrugated marginal portions of the strip, spring pressed means for holding the corrugated strip with its margins in contact with said toothed flanges, and means for advancing said take-off wheel after said die members are separated.

13. In combination, means for corrugating a metal strip, a pair of die members having means for forming the central longitudinal portion of said strip, a take-off roll comprising flanges having teeth co-operating with the corrugations of the marginal portions of the strip, spring means for holding the corrugated strip in contact with the teeth on said marginal portions of the take-off roll, said die members having knock-out members for clearing the corrugated strip of the dies when the dies are separated, and intermittently actuating means for advancing the take-off roll when the dies are separated.

14. In combination, a stationary die member, a movable die member reciprocable towards and away from the stationary die member, means for feeding a corrugated ribbon of metal between said die members, said die members having means for forming the intermediate longitudinal portion of the corrugated ribbon, a take-off roll intermittently actuated for taking off the formed portion of the corrugated ribbon, said feeding means and said take-off means being adapted to support said corrugated strip on a line lying above the stationary die member for advancing the corrugated ribbon out of contact with the die members.

15. In combination, a main frame having a crank shaft, a cross-head, guides for the cross-head, a connecting rod between the crank shaft and the cross-head, a table, a die frame on said table, said die frame having corrugating rolls mounted at one end and a take-off roll mounted at the other end for advancing a corrugated strip or ribbon of sheet metal from said corrugating roll to said take-off roll, means for intermittently actuating said rolls in unison, a lower die member mounted on said die frame, an upper die member mounted on the cross-head, said die members having means for slitting and forming the central longitudinal portion of the corrugated metal strip or ribbon.

16. A pair of die members for forming the central longitudinal portion of a corrugated metal ribbon, comprising slitting means for slitting the transverse corrugations of the ribbon adjacent their margins, forming means for shaping the intermediate portions of the corrugations, and closing means for closing together the ends of said slitted and formed corrugations, and means for depressing the central longitudinal portion of the corrugated ribbon to form a half tube or channel.

17. Means for forming a corrugated metal strip into a gutter or tube half, comprising slitting means for slitting the corrugations adjacent their margins, off-setting means for offsetting the bottom walls of the corrugations to form a channel, forming means for forming the slitted corrugations, and for closing the ends of said slitted corrugations.

18. In a die for forming a radiator tube out of a corrugated ribbon of sheet metal, the combination of a central longitudinal forming member, a pair of bars clamped against the sides of the central longitudinal forming member, said bars comprising racks of teeth along each outermost bar, one end of each of said outermost bars comprising a shear plate for slitting the corrugations of the ribbon adjacent the margins, forming means on the intermediate bars for bringing together the sheared ends of the corrugations, forming means on the central longitudinal member for reducing the size of the corrugations and for offsetting the bottom walls of the corrugations to form a gutter or channel.

19. In combination, a pair of die members for forming a tube half out of a corrugated ribbon in successive stages, the first stage of the die at the front end of each end of the dies comprising slitting means for slitting the corrugations transversely adjacent the margins, a second stage comprising co-operating forming die members for offsetting the strip between said slits along the longitudinal central part to form a gutter and decrease the central parts of the corrugations in width, and a final stage for collapsing the ends of the corrugations and for reducing the height of the corrugations at the sides of said gutter.

20. The combination of a pair of forming dies comprising, slitting means for slitting the corrugations of a strip of corrugated sheet metal transversely above the bottom wall of the corrugations, co-operating forming means for offsetting the central longitudinal portion of the bottom wall and for reducing the widths of the central portions of the corrugations, and for partially collapsing the ends of the corrugations at the slitted parts, said means comprising also means for forming diagonal walls extending to the bottom wall of the channel from the sides of the corrugations, and co-operating forming means for pressing down the tops of the intermediate parts of the corrugations to substantially the plane of the tops of the original corrugations, and simultaneously flattening down the diagonal walls to reduce the corrugations in width and to pinch together the ends of the corrugations.

21. Die means for forming a corrugated ribbon into a tube half comprising the combination of a pair of rack bars on each die member, the front parts of said rack bars comprising slitting means for slitting the corrugations transversely adjacent the margins and leaving ornamental marginal loops along the ribbon fitting into the rack bars, transverse forming bars registering with the corrugations and having co-operating matrices for collapsing the slitted ends of the corrugations, said bars and co-operating matrices providing raised portions for offsetting the entire central longitudinal portion to form a gutter, and having also shoulders for forming diagonal walls extending from the sides of the corrugations to the bottom walls of the corrugations, and final forming bars with co-operating matrices for shaping the corrugations and bringing their tops down to substantially the level of the ornamental loops, and for pinching together the ends of the corrugations by flattening down the diagonal walls along the sides of the corrugations.

22. Die means including a plurality of die members for forming a corrugated ribbon into a tube half comprising the combination of a pair of rack bars on each die member, the front parts of said rack bars comprising slitting means for slitting the corrugations transversely adjacent the margins and leaving ornamental marginal loops along the ribbon fitting into the rack bars, transverse forming bars registering with the corrugations and having cooperating matrices for collapsing the slitted ends of the corrugations, said bars and co-operating matrices providing raised portions for offsetting the entire central longitudinal portion to form a gutter, and having also shoulders for forming diagonal walls extending from the sides of the corrugations to the bottom walls of the corrugations, and final forming bars with cooperating matrices for shaping the corrugations and bringing their tops down to substantially the level of the ornamental loops and for pinching together the ends of the corrugations by flattening down the diagonal walls along the sides of the corrugations, and die means for taking up a surplus of metal in the bottom wall of the gutter transversely, but short of the pinched-together ends.

23. In die means for forming a corrugated ribbon into a tube half, the combination of slitting means for slitting the corrugations transversely adjacent the margins, and leaving ornamental marginal loops, offsetting means for raising or offsetting the central portion of the ribbon to form a gutter, compressing means for compressing the sides of the corrugations and partially collapsing the ends of the same, shaping means for shaping diagonal shoulders along the sides of the corrugations, and final forming means for forming the tops and sides of the corrugations and for flattening down the diagonal shoulders to collapse the ends of the corrugations.

24. In die means for forming a corrugated ribbon into a tube half, the combination of slitting means for slitting the corrugations transversely adjacent the margins, and leaving ornamental marginal loops, offsetting means for raising or offsetting the central portion of the ribbon to form a gutter, compressing means for compressing the sides of the corrugations and partially collapsing the ends of the same, shaping means for shaping diagonal shoulders along the sides of the corrugations and final forming means for forming the tops and sides of the corrugations and for flattening down the diagonal shoulders to collapse the ends of the corrugations, and relieving means for taking up a surplus of metal between the central parts only of the corrugations.

25. In combination, means for corrugating a strip or ribbon of sheet metal, means for slitting said corrugations adjacent one margin to leave marginal loops, means for offsetting the longitudinal central portion of the corrugated strip to form a gutter, and shaping means for reducing the height of the corrugations so that the tops thereof lie in substantially the plane of the tops of the marginal loops, and means for closing the ends of said corrugations adjacent said marginal loops.

26. In combination, means for corrugating a ribbon of sheet metal, means for slitting the corrugations along their margins, means for offsetting the central longitudinal portion to form a gutter, and means for closing together the ends of the corrugations at the sides of said gutter.

27. In combination, corrugating means for corrugating a sheet metal ribbon, offsetting means for offsetting the longitudinal central portion thereof to form a gutter, and forming means for closing together the ends of the corrugations outside of the sides of the gutter.

28. In combination, a pair of die members having slitting and forming means for slitting a corrugated sheet and for forming the same into a tube half having transverse corrugations, knock-out means for said die members for stripping the sheets out of the dies, spring pressed plates at each end of the die members for holding the ends of the strip or sheet out of contact with the die portion, guides at each end for guiding the strip, and means for advancing the strip over said guides past said die members while the die members are separated.

29. In combination, corrugating rolls for transversely corrugating a ribbon of sheet metal, and reciprocating forming dies for forming a longitudinal gutter of said corrugated ribbon, said dies having means for closing the corrugations at the sides of the channel.

30. In combination, corrugating means for transversely corrugating a ribbon of sheet metal, slitting means for cutting across the corrugations to form loops at the margins, means for forming a longitudinal gutter back of the line of slits, and means for closing the slitted ends of the corrugations to thereby close the sides of the channel and for reducing the height of the corrugations along the back of the gutter.

31. In combination, corrugating mechanism for transversely corrugating a ribbon of sheet metal, means for slitting the corrugations adjacent the sides of the sheet, means for forming the corrugated sheet into a half tube construction, and means for forming the corrugations intermediate the slits into a plurality of pockets closed at their ends and open at only the bottom of the sheet.

32. In combination, corrugating mechanism for corrugating a metal strip, reciprocable die mechanism associated therewith, means for operating said die mechanism, cam mechanism controlled by the position of said die mechanism and connected to said operating means, and means for advancing the corrugated strip through the die mechanism intermittently, said means including gear and ratchet mechanism operatively connected to said cam mechanism.

33. In combination, corrugating rolls, a take-off roll, common actuating means for the corrugating rolls and the take-off roll, and adjustable means associated with the take-off roll for angularly adjusting the position of the take-off roll with respect to the corrugating rolls.

34. In combination, corrugating mechanism for corrugating a metal sheet, take-off mechanism, and forming mechanism positioned intermediate the corrugating and take-off mechanism for contemporaneously performing a plurality of operations upon the sheet as it is progressively advanced through the forming mechanism by the take-off mechanism to form the said sheet into a cellular half tube construction having corrugated edges, said take-off mechanism serving to pull the sheet from the corrugating mechanism through the forming mechanism.

In witness whereof, I hereunto subscribe my name this 8th day of May, 1923.

FRED M. OPITZ.